United States Patent [19]

Shintani et al.

[11] Patent Number: 5,463,436
[45] Date of Patent: Oct. 31, 1995

[54] REMOTE CONTROLLABLE CAMERA SYSTEM

[75] Inventors: Dai Shintani; Hiroyuki Okada, both of Sakai; Takeo Hoda, Kawachinagano; Shuji Izumi, Sakai; Hiromu Mukai, Kawachinagano; Osamu Hatamori, Osaka; Sadafusa Tsuji, Osakasayama, all of Japan

[73] Assignee: Minolta Camera Kabushiki Kaisha, Osaka, Japan

[21] Appl. No.: 240,096

[22] Filed: May 9, 1994

Related U.S. Application Data

[63] Continuation of Ser. No. 615,434, Nov. 16, 1990, abandoned.

[30] Foreign Application Priority Data

Nov. 17, 1989 [JP] Japan .................................. 1-300127
Nov. 17, 1989 [JP] Japan .................................. 1-300128

[51] Int. Cl.⁶ ............................................... G03B 19/00
[52] U.S. Cl. .............................................. 354/81; 354/266
[58] Field of Search ................................. 354/81, 195.1, 354/293, 266

[56] References Cited

U.S. PATENT DOCUMENTS

| | | | |
|---|---|---|---|
| 4,719,485 | 1/1988 | Shikaumi | 354/400 |
| 4,794,417 | 12/1988 | Sekiguchi | 354/400 |
| 5,012,335 | 4/1991 | Cohodar | 354/81 X |
| 5,014,079 | 5/1991 | Kakita et al. | 354/266 |
| 5,066,970 | 11/1991 | Kakita et al. | 354/402 |
| 5,128,770 | 7/1992 | Inana et al. | 354/293 X |
| 5,361,115 | 11/1994 | Ohtsuka et al. | 354/81 X |

FOREIGN PATENT DOCUMENTS

| | | |
|---|---|---|
| 60-138522 | 7/1985 | Japan . |
| 60-139076 | 7/1985 | Japan . |
| 60-139998 | 7/1985 | Japan . |

*Primary Examiner*—Howard B. Blankenship
*Attorney, Agent, or Firm*—Willian Brinks Hofer Gilson & Lione

[57] ABSTRACT

In a remote controllable camera system having a remote controller, a camera body provides with calculation means for calculating an angle between the remote controller and an optical axis of a photo-taking lens and moving means for moving the optical axis to a point where the angle is a predetermined value. Furthermore, the camera body provides with judging means for judging whether or not the remote controller is within the field of view of the phototaking lens and displaying means for displaying the judging result of the judging means.

21 Claims, 27 Drawing Sheets

FIG. 6(A)
FIG. 6(B)
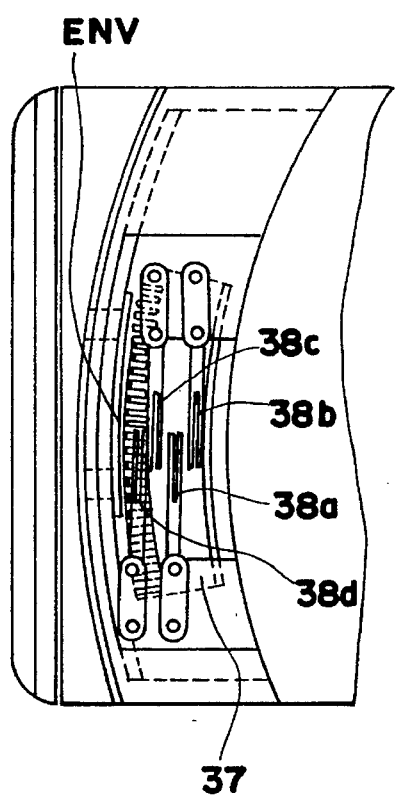
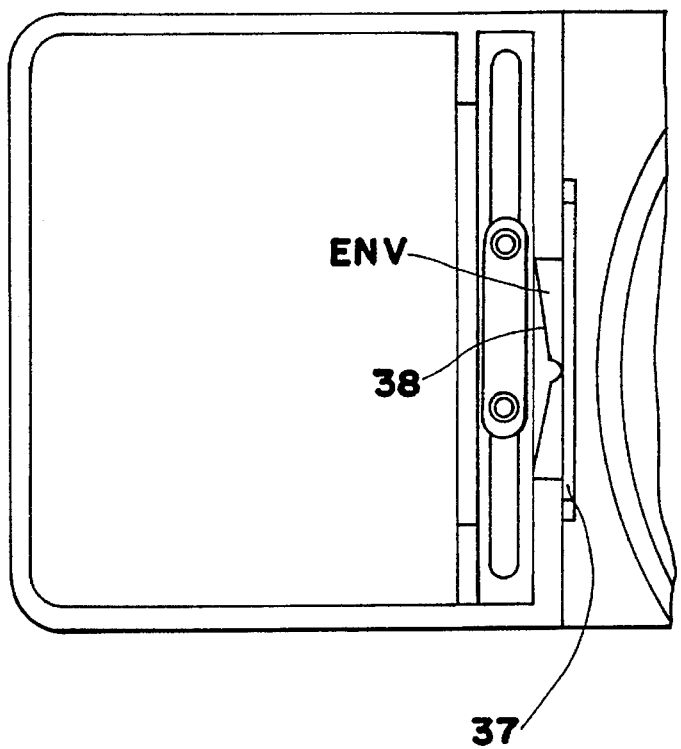

FIG. 13 (B)

```
        32°  16°  8°  4°  2°  1°
  b7  b6  b5  b4  b3  b2  b1  b0
  |__||_____|
   not         angle 6 bit
   use
  1: left / 0: right
```

FIG. 13 (C)

```
        32°  16°  8°  4°  2°  1°
  b7  b6  b5  b4  b3  b2  b1  b0
  |__||_____|
   not         angle 6 bit
   use
  1: up / 0: down
```

FIG.18

| object distance (m) | focus position |
|---|---|
| ~ 8.5 | 1 |
| 8.5 ~ 5.6 | 2 |
| 5.6 ~ 4.2 | 3 |
| 4.2 ~ 3.3 | 4 |
| 3.3 ~ 2.8 | 5 |
| 2.8 ~ 2.4 | 6 |
| 2.4 ~ 2.1 | 7 |
| 2.1 ~ 1.9 | 8 |
| 1.9 ~ 1.7 | 9 |
| 1.7 ~ 1.54 | 10 |
| 1.54 ~ 1.42 | 11 |
| 1.42 ~ 1.32 | 12 |
| 1.32 ~ 1.23 | 13 |
| 1.23 ~ 1.15 | 14 |
| 1.15 ~ 1.08 | 15 |
| 1.08 ~ 1.03 | 16 |
| 1.03 ~ 0.972 | 17 |
| 0.972 ~ 0.925 | 18 |
| 0.925 ~ 0.884 | 19 |
| 0.884 ~ 0.846 | 20 |
| 0.846 ~ 0.812 | 21 |
| 0.812 ~ 0.781 | 22 |
| 0.781 ~ 0.753 | 23 |
| 0.753 ~ 0.734 | 24 |
| 0.734 ~ 0.700 | 25 |

FIG.20

| zoom position | typical focal length | encoder pattern Zenc 0 1 2 3 4 GND | function Zenc 0 1 2 3 4 | hexadecimal code |
|---|---|---|---|---|
| 1 | 90 mm (longest) | | H L H H H | 17 H |
| 2 | 88 mm | | H L H H L | 16 H |
| 3 | 85 mm | | H L H L L | 14 H |
| 4 | 82 mm | | H L H L H | 15 H |
| 5 | 79 mm | | H L L L H | 11 H |
| 6 | 76 mm | | H L L L L | 10 H |
| 7 | 73 mm | | H L L H L | 12 H |
| 8 | 70 mm | | H L L H H | 13 H |
| 9 | 67 mm | | L L L H H | 03 H |
| 10 | 64 mm | | L L L H L | 02 H |
| 11 | 61 mm | | L L L L L | 00 H |
| 12 | 58 mm | | L L L L H | 01 H |
| 13 | 55 mm | | L L H L H | 05 H |
| 14 | 52 mm | | L L H L L | 04 H |
| 15 | 49 mm | | L L H H L | 06 H |
| 16 | 46 mm | | L L H H H | 07 H |
| 17 | 43 mm | | L H H H H | 0F H |
| 18 | 41 mm | | L H H H L | 0E H |
| 19 | 38 mm (shortest) | | L H H L L | 0C H |
| 20 | during retracting | | L H H L H | 0D H |
| 21 | retracted | | L H L L H | 09 H | black : ON

L : ON
H : OFF

FIG.21 table (T1)

| focus position | parameter D |
|---|---|
| 1 | 11715 |
| 2 | 6622 |
| 3 | 4726 |
| 4 | 3683 |
| 5 | 3023 |
| 6 | 2567 |
| 7 | 2233 |
| 8 | 1978 |
| 9 | 1776 |
| 10 | 1614 |
| 11 | 1479 |
| 12 | 1367 |
| 13 | 1271 |
| 14 | 1189 |
| 15 | 1118 |
| 16 | 1055 |
| 17 | 999 |
| 18 | 950 |
| 19 | 906 |
| 20 | 866 |
| 21 | 830 |
| 22 | 797 |
| 23 | 767 |
| 24 | 740 |
| 25 | 715 |

$f = \beta \cdot D$ table (T2)

| focal length | zoom position |
|---|---|
| ~ 38 | 19 |
| ~ 41 | 18 |
| ~ 43 | 17 |
| ~ 46 | 16 |
| ~ 49 | 15 |
| ~ 52 | 14 |
| ~ 55 | 13 |
| ~ 58 | 12 |
| ~ 61 | 11 |
| ~ 64 | 10 |
| ~ 67 | 9 |
| ~ 70 | 8 |
| ~ 73 | 7 |
| ~ 76 | 6 |
| ~ 79 | 5 |
| ~ 82 | 4 |
| ~ 85 | 3 |
| ~ 88 | 2 |
| 89 ~ | 1 |

FIG.25(B)
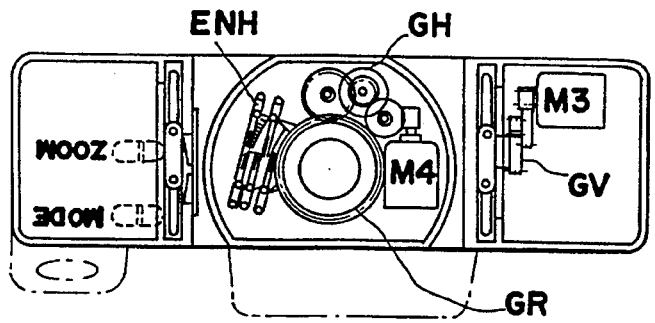
FIG.25(C)    FIG.25(A)
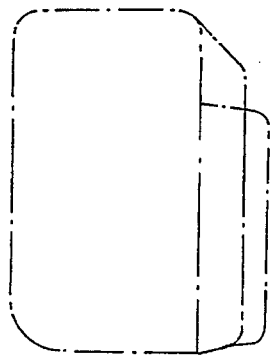    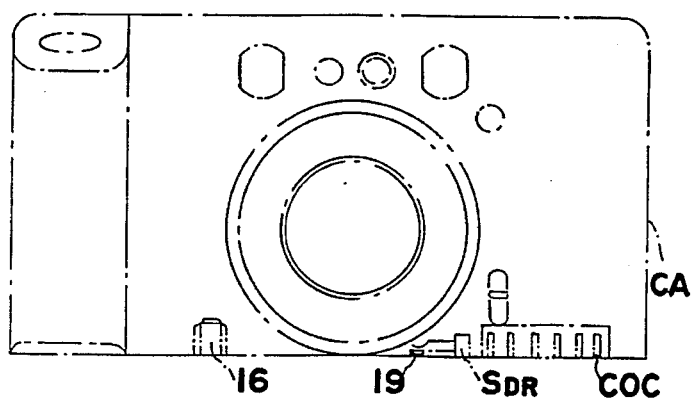
FIG.25(E)    FIG.25(D)
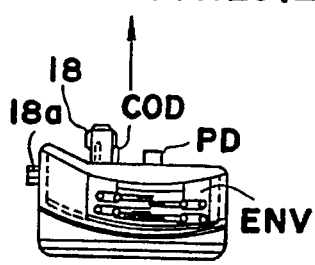    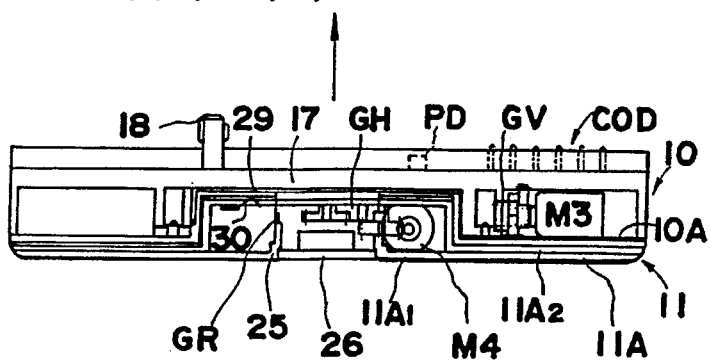

REMOTE CONTROLLABLE CAMERA SYSTEM

This application is a continuation of application Ser. No. 07/615,434, filed Nov. 16, 1990, now abandoned.

BACKGROUND OF THE INVENTION

1. Field of the Invention

This invention involves a camera system wherein the camera body may be remotely controlled, and more particularly, in which the direction of the optical axis of the photo-taking lens of the camera may be altered via remote control operation.

2. Description of the Prior Art

It is convenient if, when a camera operator takes a photograph at a distance from the camera body, the phototaking lens' optical axis may be remotely controlled such that it faces the operator (subject) in the desired position.

Laid-open of patent applications Sho 60-139998, Sho 60-138522 and Sho 60-139076 show a system wherein the optical axis of the photo-taking lens may be moved to face a set direction in relation in the remote control device via operation of a pan head drive motor, when a pan head attached to the camera has received a signal transmitted from a remote control device.

However, because the conventional art does not calculate the angle between the remote control device and the optical axis of the photo-taking lens, the remote control device must transmit a continuous signal in order to move the optical axis of the photo-taking lens to the desired angle, through operation of the pan head drive motor. In addition, the aforementioned conventional art describes another embodiment in which the need for transmission of a steady signal is eliminated by enabling the remote control device to transmit information on the rotation angle of the photo-taking lens' optical axis. However, this creates the problem that, since the angle between the remote control device and the lens' optical axis is not calculated, the operator does not know what angle-related information should be transmitted in order to align the lens' optical axis with the operator, where the operator is not directly in line with the optical axis.

Moreover, the conventional art did not provide any means to inform the operator of the remote control device whether he or she was within the lens' angle of view.

SUMMARY OF THE INVENTION

An object of this invention is to provide a remote-controllable camera system wherein the optical axis of the photo-taking lens may be moved, such that a remote control device and the optical axis of the photo-taking lens are placed in a set position without the need for transmission of a steady signal from said remote control device.

Another object of this invention is to provide a remote-controllable camera system where an operator holding said remote control device can know whether said operator is inside the angle of view.

In order to achieve the first object given above, the remote-controllable camera system of this invention comprises the following:

a remote control device for sending a predetermined signal;

means, provided in a camera body, for receiving the predetermined signal sent from said remote control device;

means, provided in the camera body, for calculating an angle between said remote control device and an optical axis of a photo-taking lens mounted on the camera body on the basis of the receiving result of said receiving means; and means for moving the optical axis of the photo-taking lens to a point where the angle between said remote control device and the optical axis is a predetermined value on the basis of the calculation result of said calculating means, said moving means being detachable from the camera body.

Further, in order to achieve the second object above, the remote-controllable camera system of the present invention comprises the following:

a remote control device for sending a predetermined signal;

means for receiving the predetermined signal sent from said remote control device;

means for calculating an angle between said remote control device and an optical axis of a photo-taking lens mounted on a camera body on the basis of the receiving result of said receiving means;

means for inputting data on a field of view of the photo-taking lens; means for judging means whether or not said remote control device is in the field of view on the basis of the calculation result of said calculation means; and means for displaying the Judging result of said judging means.

BRIEF DESCRIPTION OF THE DRAWING

FIGS. 6A and 6B show the encoder of vertical rotation drive unit;

FIGS. 13A, 13B, and 13C is a diagram showing the signal transmission and the angle data;

FIG. 18 is a list showing the relationship between the distance to the object and the focus position;

FIG. 20 is a diagram for explaining the zoom encoder;

FIG. 21 is a diagram showing details of calculation for the auto program zoom;

FIGS. 25A–25E illustrate the external structure of the camera body of the third embodiment of the present invention;

DESCRIPTION OF THE PREFERRED EMBODIMENT

An embodiment of this invention is explained below with diagrams.

Figure 1A:
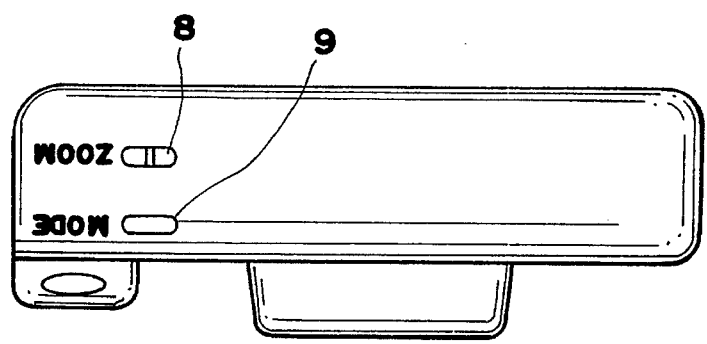
FIGS. 1A, 1B, and 1C illustrate the external structure of the camera body of the first embodiment of the present invention.
Figure 1C:
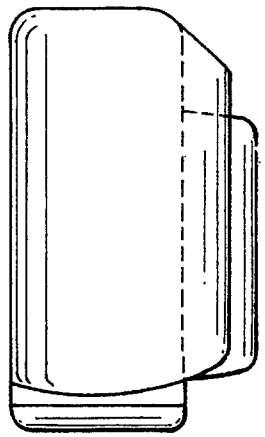
Figure 1B:
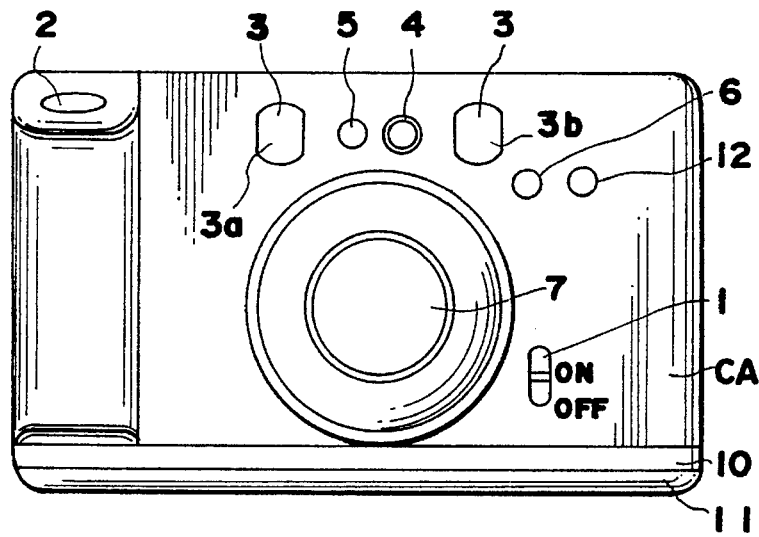

FIG. 1 illustrates the external structure of the camera body CA, where (A) is a plane view, (B) a front view and (C) a left side view. In these diagrams, the switch 1 is the main switch which, when set in the ON position, sets the camera ready for operation and when set in the OFF position, prevents the camera from being operated.

The button 2 is a release button. When it is pressed partly down to the first stage, the camera measures light and distance to the subject, and when it is pressed further to the second stage, the camera adjusts the exposure.

The windows 3 are autofocus windows. One of them, 3a, emits an infrared beam to measure the distance to the subject, and the other window, 3b, receives its reflection.

The unit 4 is a finder unit.

The window 5 is a photometric window.

The window 6 is a remote control window to receive the infrared beam from the remote controller. The remote controller is explained later.

The unit 7 is a lens unit.

The lever 8 is a zoom lever. When this zoom lever is slid to the right, zooming operation is executed towards the longest focal length, and when it is slid to the left, zooming operation towards the shortest focal length is executed.

The button 9 is a mode-select button. Each time this button is pressed, the mode changes alternately from normal mode to remote control mode and vice versa.

The unit 10 is a vertical rotation drive unit. This unit shifts the optical axis of a photo-taking lens vertically when the camera is in the remote control mode.

The unit 11 is a horizontal rotation drive unit. This unit moves the optical axis of the photo-taking lens horizontally when the camera is in the remote control mode.

The indicator 12 is an LED (light-emitting diode) indicator. This indicates whether the remote control operator is within the angle of view of the photo-taking lens when the camera is in the remote control mode.

Figure 2A:
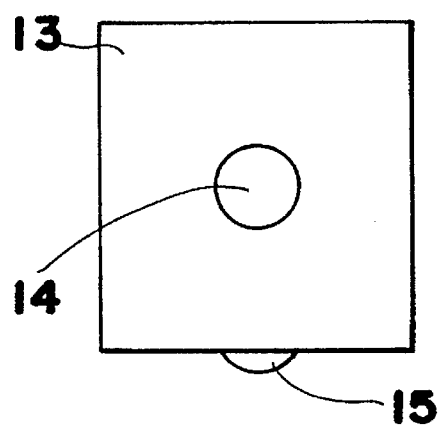
FIGS. 2A, 2B, and 2C illustrate the remote controller.
Figure 2C:
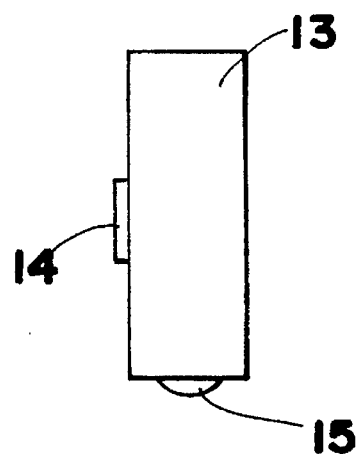
Figure 2B:
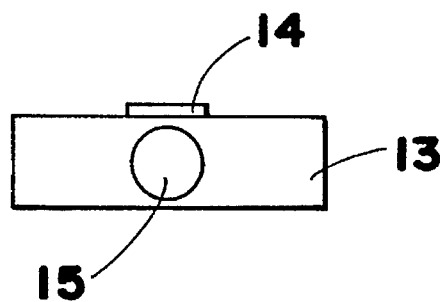

FIG. 2 illustrates the remote controller 13, where (A) is a plane view, (B) a front view and (C) a right side view. The remote controller 13 has an operation button 14 on top and an infrared-emitting LED 15 partially exposed on its front. Control signals sent to the camera for remote-control operation are sent by infrared beam.

Figure 3:
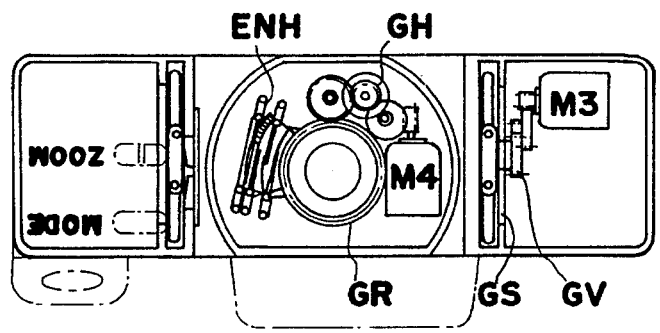
FIGS. 3A, 3B, and 3C show the mechanism of the vertical rotation drive unit.
Figure 3:
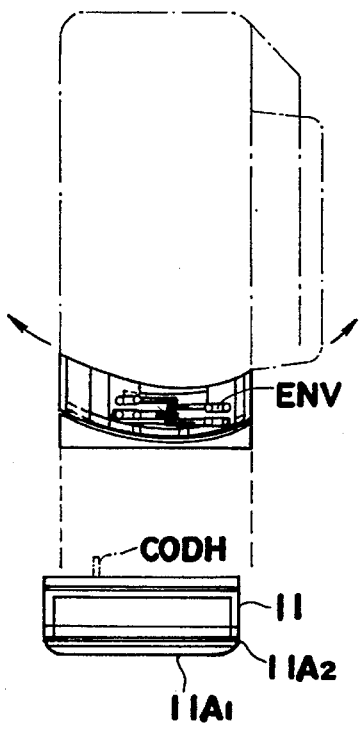
Figure 3:
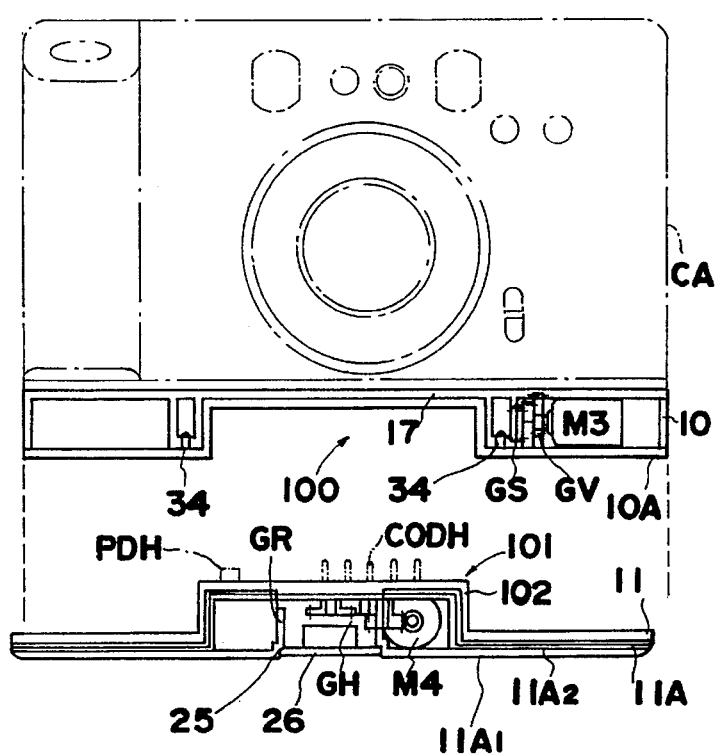
Figure 4A:
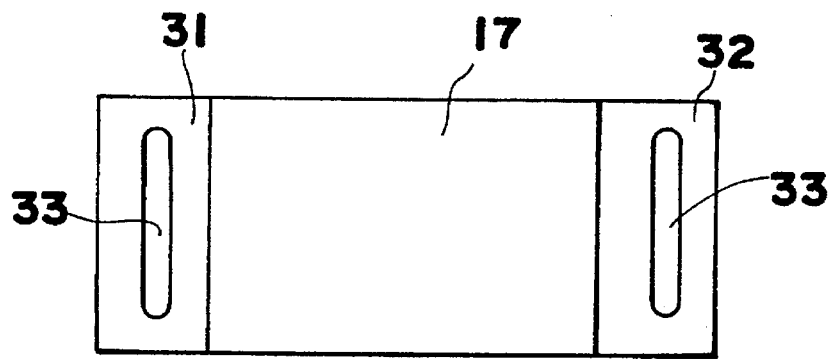
FIGS. 4A through 4E illustrate the moving mechanism of the vertical rotation drive unit.
Figure 4B:
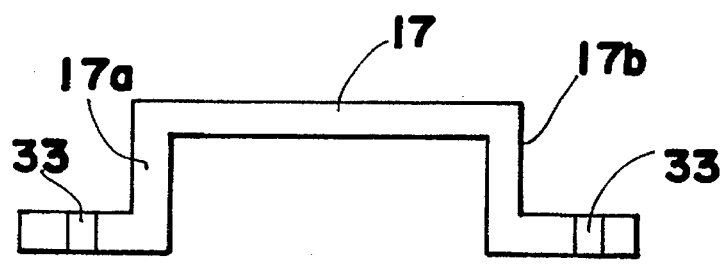
Figure 4C:
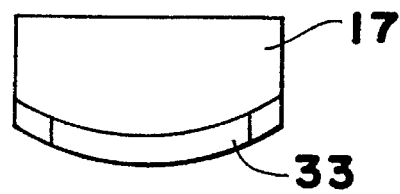
Figure 4D:
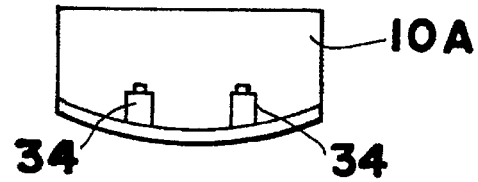
Figure 4E:
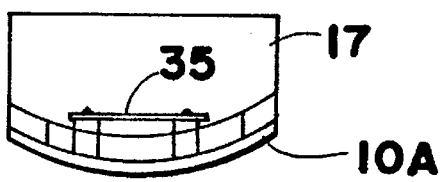

FIG. 3 shows the mechanism of the vertical rotation drive unit 10, integrated in the camera body CA, and that of the detachable horizontal rotation drive unit 11, which can be mounted to the vertical drive unit 10. FIG. 3 (A) is a front sectional view, and (B) a plane view. FIG. 3 (C) is a sectional view of FIG. 3 (A). In FIG. 3, the camera body CA is supported by a movable vertical stand unit 10A. The lower frame of the camera body CA is a movable member 17.

Figure 12:
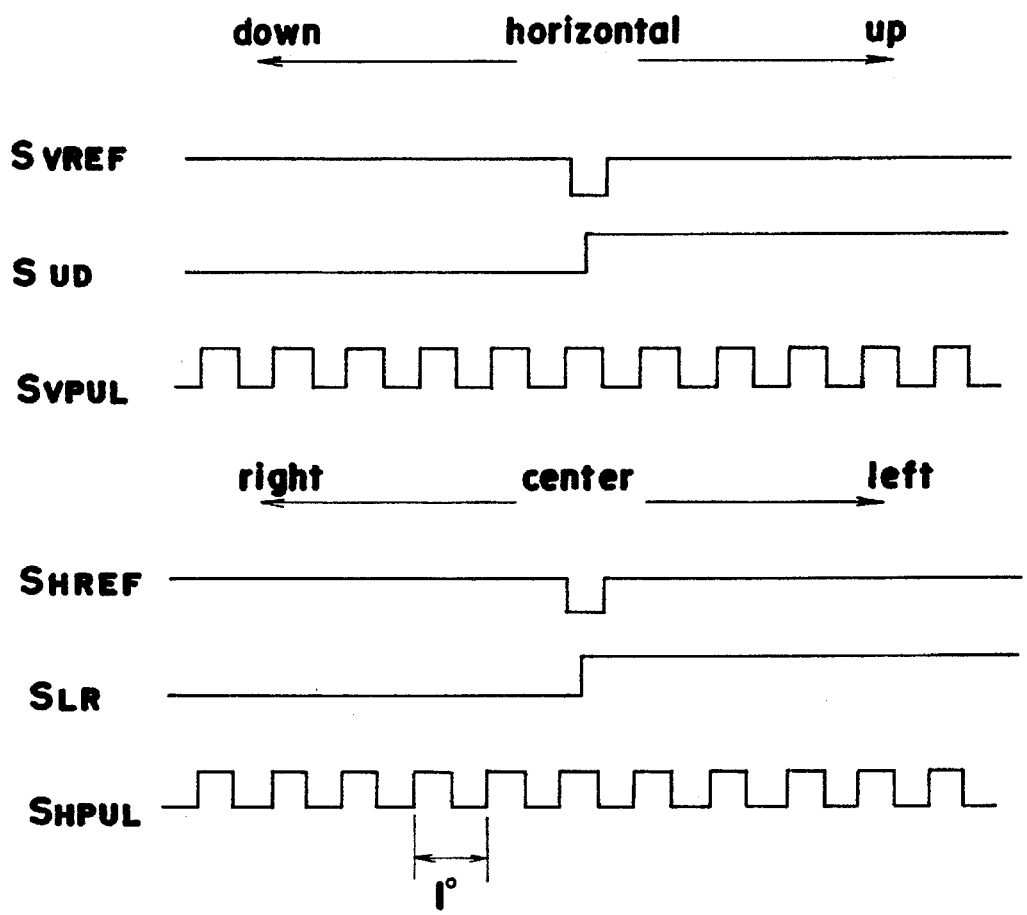
FIG. 12 is a diagram showing the signals generated by the encoder.

The vertical rotation drive unit 10 is equipped with a vertical rotation driving motor M3 and reduction gears GV connected to the motor and an encoder ENV. The encoder generates signals as illustrated in FIG. 12. All of these components are fixed to the vertical stand unit 10A. The reduction gears GV are connected to the moving gear GS of the moving member 17. Through the rotation of the motor M3, the camera body CA rotates in relation to the vertical stand unit 10A, which moves the optical axis of the phototaking lens 7 in a vertical fashion.

FIG. 4 plainly illustrates the moving mechanism. FIG. 4(a) is a plane view of the movable member 17, 4(b) a front view, and 4(c) a right side view. FIG. 4 (d) shows a right side view of the vertical stand unit 10A and 4(e) a right side view of the movable member 17 and the vertical stand unit 10A in combination.

The movable member 17 has long holes 33 on its right and left flaps 31 and 32. The pins 34 on the vertical stand unit 10A go through these long holes 33. When the pins are placed in these holes, a plate 35 is attached to the ends of the pins to prevent 10A and 17 from becoming separated. The bottom parts of the movable member 17 and the vertical stand unit 10A are both bow-shaped. In response to this, the long holes 33 are also bow-shaped. When the movable member 17 moves in relation to the vertical stand unit 10A, its movement draws a bow-shaped curve. A center position of the bow-shaped curve corresponds to approximately the center of gravity of the camera body CA. Driving force for moving the movable member 17 is so weak because the center of gravity of the camera does not move during the moving period of the movable member 17.

Figure 5A:
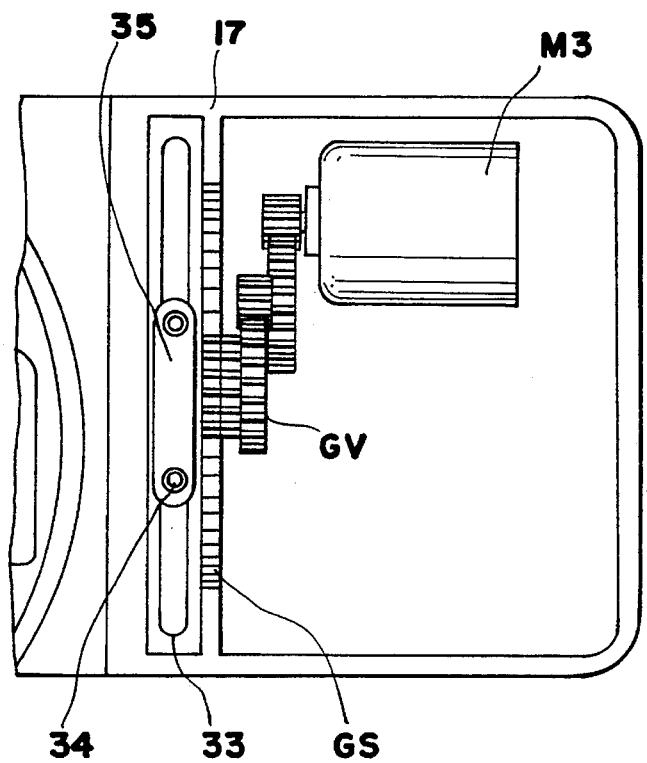
FIGS. 5A, 5B, and 5C illustrate the vertical rotation drive unit.
Figure 5B:
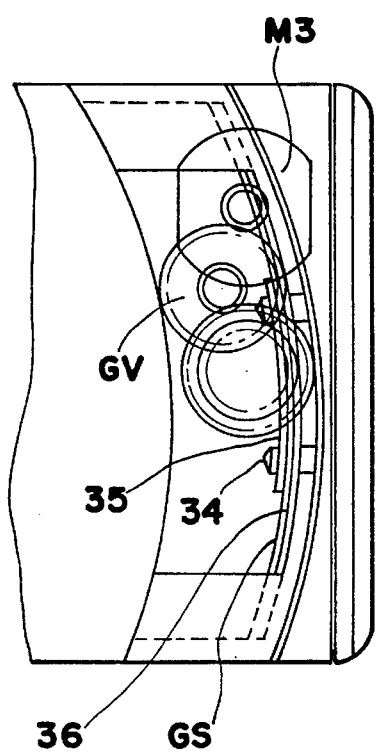
Figure 5C:
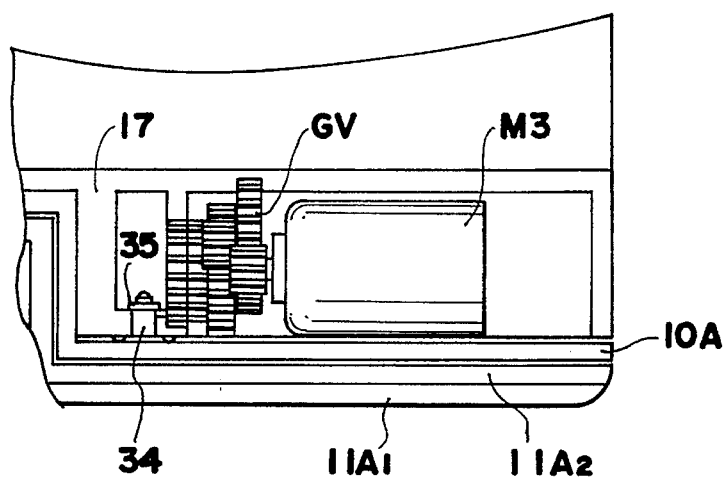

FIG. 5 mainly illustrates the vertical rotation drive unit 10. FIG. 5 (A) is a plane view, (B) a side sectional view and (C) a front view. Here, the driving gear GS is also bow-shaped and located under the right wall panel 17b of the movable member 17. 36 in FIG. 5 (B) illustrates the pitch circle of the driving gear GS.

FIG. 6 shows the encoder ENV, which detects vertical location. FIG. 6 (A) is a side sectional view and (B) a plane view. The encoder plate 37 is attached to the left wall of the vertical stand unit 10A. The armatures 38 are attached to the inner side of the left wall plate 17a of the movable member 17. There are four armatures 38a, 38b, 38c and 38d corresponding to various patterns formed on the encoder plate 37. Specifically, 38b is for grounding and 38a, 38c and 38d generate SUP, SVREF and SVPUL, respectively as indicated in FIG. 12.

Returning to FIG. 3, the detachable horizontal rotation drive unit 11 is attached to the camera body CA, which has an integrated vertical rotation drive unit in the form described above. The horizontal rotation drive unit 11 has a convex-shaped unit 101 which fits into a concave-shaped unit 100 constructed in the aforementioned vertical rotation drive unit 10. This structure reduces the thickness of the camera in vertical direction. The rotating member 102 of the horizontal rotation drive unit 11 contains connecting pins CODH and mount detection pin PDH. When the horizontal rotation drive unit 11 is attached to the camera body CA, the connecting pins CODH become connected to connectors COC at the bottom of the camera body CA, and the pin PDH works on the mount detection switch SDR (See FIG. 11) and sets it in ON position.

The horizontal rotation drive unit 11 has a motor M4, reduction gears GH connected to the motor, and an encoder ENH, which generates signals as illustrated in FIG. 12.

The horizontal stand unit 11A comprises a horizontal stand unit 11A1 and another horizontal stand unit 11A2. They are fastened at the sides and separated at the center. On the horizontal stand unit 11A1 is placed the motor M4, and the reduction gears GH are attached to the horizontal stand unit 11A2. The rotating member 102 rotates horizontally in relation to the horizontal stand unit 11A by operating the motor M4.

Figure 7A:
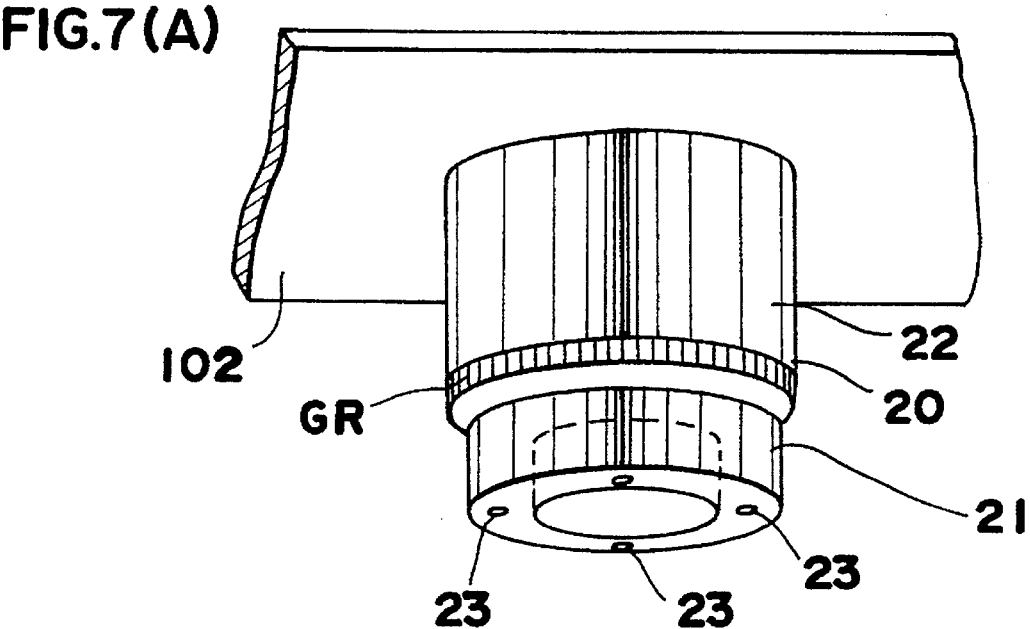
FIGS. 7A, 7B, and 7C illustrate the moving mechanism of the horizontal rotation drive unit.
Figure 7B:
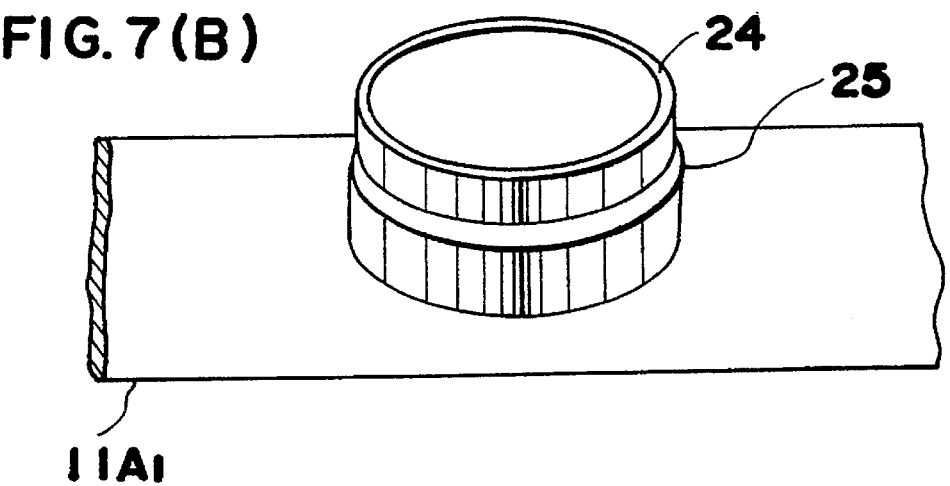
Figure 7C:
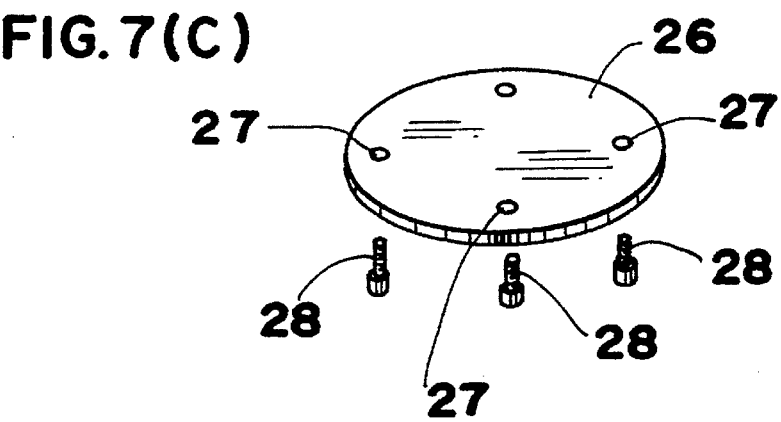

As illustrated in FIG. 7, there is a cylindrical member 22 protruding downward at the middle of the rotating member 102. This cylindrical member 22 consists of a first cylindrical member 20 and a second cylindrical member 21, which continues from the cylindrical member 20 but is slightly smaller in diameter than it. There is a rotation gear GR at the outer bottom circumference of the cylindrical member 20. This gear engages with the aforementioned reduction gears GH. At the bottom surface of the cylindrical member 21 there are screw holes 23. On the other hand, there is another cylindrical member 24 protruding upward from the horizontal stand unit 11A1. This cylindrical member 24 fits in with the aforementioned cylindrical member 21.

The disc 26 with pierced-through holes 27 is inserted into the cylindrical member 24 from the bottom of the horizontal stand unit 11A1, until it comes in contact with the stepped-in 25. At this point, by applying screws 28 into the screw holes 23 of the cylindrical member 21 through the pierced holes 27, the rotatable cylindrical member 21 is connected and fixed to the cylindrical member 24. This means that the rotating member 102 has been fixed in a rotatable fashion to the horizontal stand unit 11A1. Therefore, when the horizontal rotation drive unit 11 is connected to the vertical rotation drive unit 10 or the camera body CA, so that the concave-shaped 100 and convex-shaped 101 are engaged, the camera body CA supported by the rotating member 102 becomes rotatable in relation to the horizontal stand unit 11A.

Figure 8:
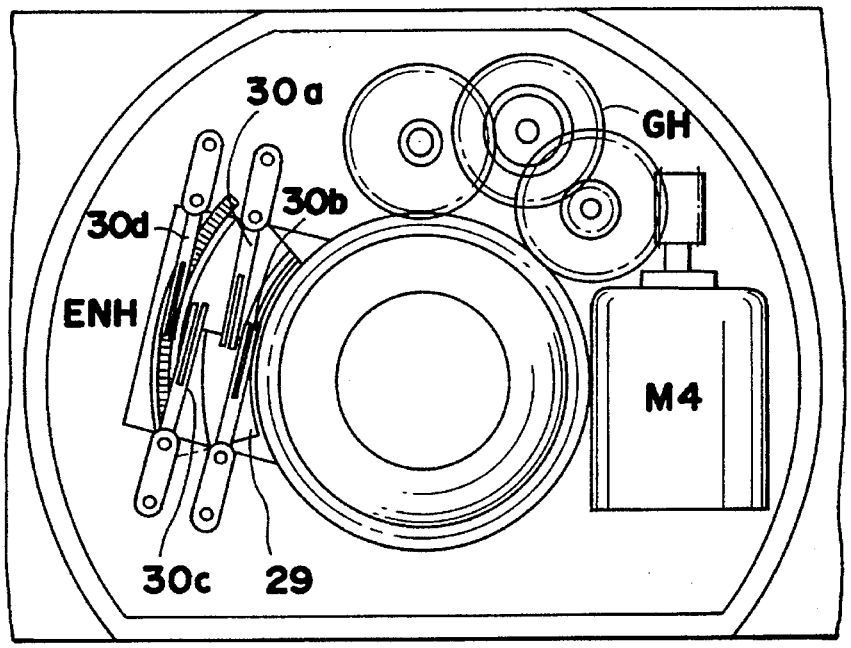
FIG. 8 shows the encoder of horizontal rotation drive unit.
Figure 9:
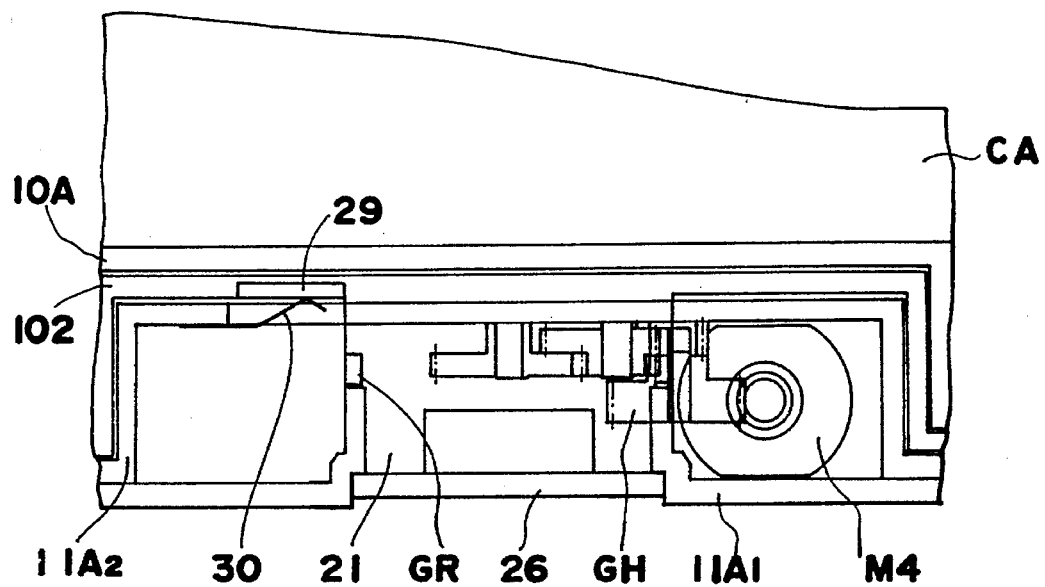
FIG. 9 mainly illustrates the horizontal rotation drive unit.

The encoder plate 29 of the encoder ENH is attached to the rotating member 102 as illustrated in FIG. 9. The armatures 30 are fixed to the horizontal stand unit 11A2. The relation between the encoder plate 29 and the armatures 30 is shown in FIG. 8. Various encoder patterns corresponding to armatures 30a, 30b, 30c and 30d are formed on the encoder plate 29. The armature 30b is for grounding. The armatures 30c, 30a and 30d generate signals SLR, SHREF and SHPUL, respectively, as illustrated in FIG. 12.

Figure 10:
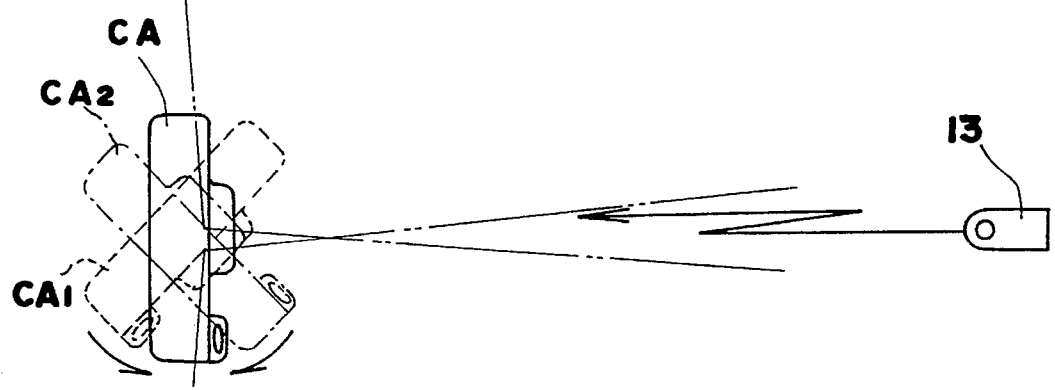
FIGS. 10A and 10B is a diagram showing the rotation of the camera body.
Figure 10:
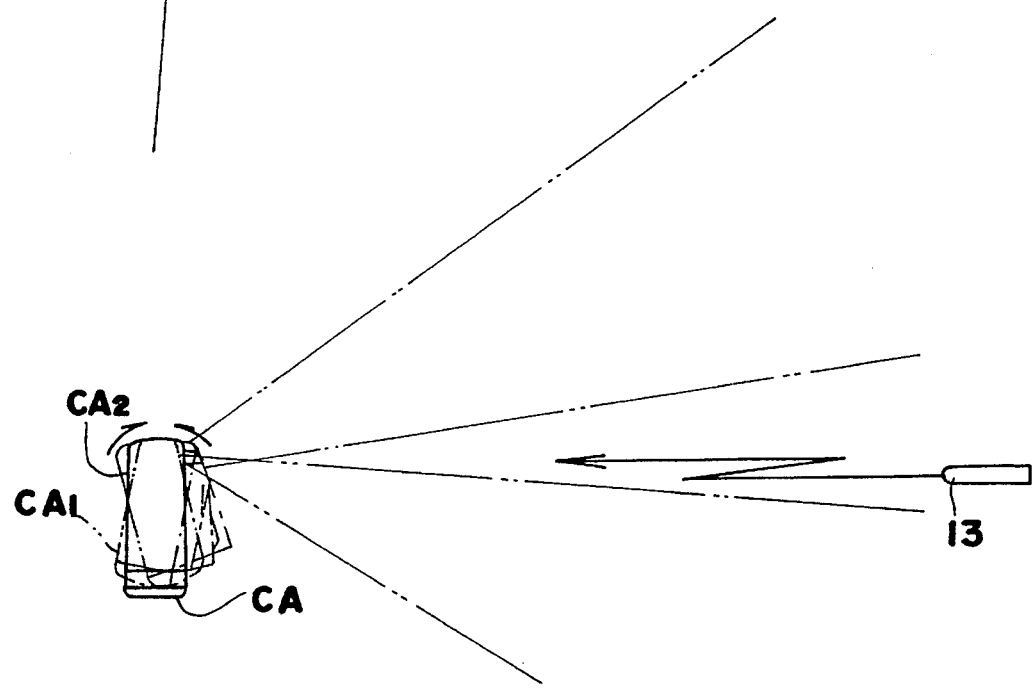

A conceptual plan wherein the camera body CA is rotated in a horizontal fashion, and one wherein the camera body CA is rotated in a vertical fashion, based on the above-described structure by the remote controller 13, are shown in FIGS. 10 (a) and 10(b), respectively. In these Figures, the solid line camera body CA moves in the manner indicated by the dotted line CA1 and the alternately dotted and dashed line CA2.

Figure 11:
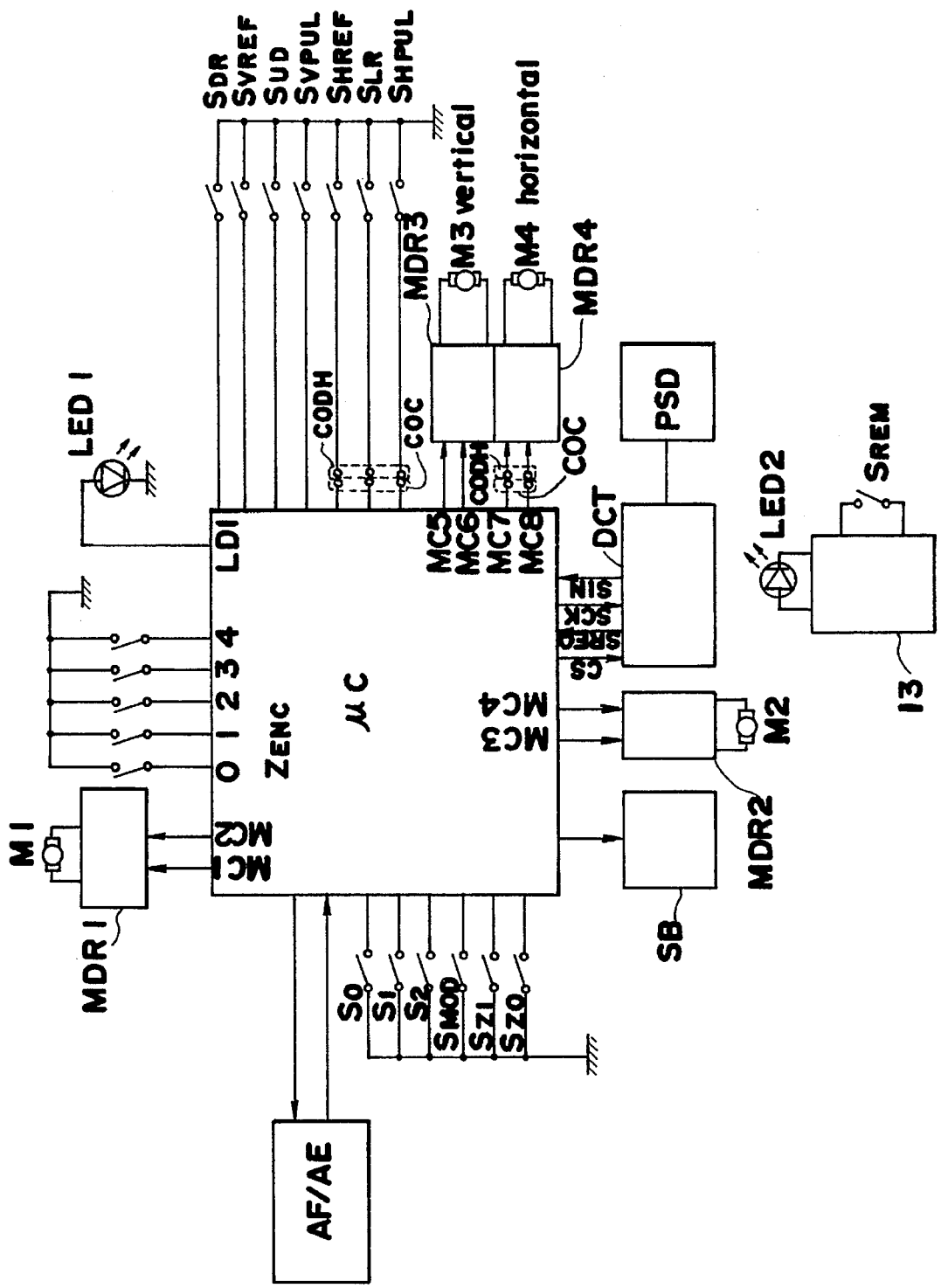
FIG. 11 is a block circuit diagram showing the camera system of the first embodiment.

The block circuit diagram for the camera system contained in this embodiment is illustrated in FIG. 11, as explained below. In this figure, the micro-computer μC controls operations including measurement of light, distance and film advancing in accordance with the status of the switches, as described below.

First, an explanation of each switch is given. SO is the main switch. When this switch is ON, the camera is ready for operation, and when it is OFF, the camera cannot operate.

S1 is a light and distance-measuring switch. This switch turns ON when the release button 2 in FIG. 1 is pressed to the first stage.

S2 is a release switch. This switch turns ON when the release button is pressed further to the second stage.

SMOD is a mode switch. This switches ON and OFF each time the mode-select button 9 in FIG. 1 is pressed.

SZI is a zoom-in switch. This switch turns ON when the zoom lever 8 in FIG. 1 is slid to the right.

SZO is a zoom-out switch. This switch turns ON when the above zoom lever 8 is shifted to the left.

SDR is a mount detection switch. This switch turns ON when the horizontal rotation drive unit 11 has been mounted to the camera body CA.

SVREF is a vertical reference switch. This turns ON when the camera body CA is in a horizontal relationship to the ground.

SUD is an up/down detection switch. This turns ON when the camera body CA is facing downward and turns OFF when it is facing upward.

SVPUL is a switch which alternately turns ON and OFF each time the camera body CA moves 1 degree upward or downward. These switches SVREF, SUD and SVPUL are located on the above-mentioned encoder ENV.

SHREF is a horizontal reference switch. It turns ON when the camera body CA is at the initial position. In this embodiment, the initial position refers to the central position, where there is no horizontal discrepancy between the camera body CA and the horizontal stand unit 11A.

SLR is a right/left detection switch, which turns ON when the camera body CA is facing right, and turns OFF when it is facing left.

SHPUL is a switch which alternately turns ON and OFF each time the camera body CA moves 1 degree in a right-hand or left-hand direction.

These switches SHREF, SLR and SHPUL are located on the above-mentioned encoder ENH and their status is detected by the micro-computer μC through the connecting pins CODH and connectors COC.

The signals generated by the above switches SVREF, SUD, SVPUL, SHREF, SLR and SHPUL are shown in FIG. 12.

The zoom encoders ZENC0 to ZENC4 for the lens are explained later.

The AF/AE is a light/distance measuring block. It performs measurement of light and distance by signals from the micro-computer μC, and returns the results to the micro-computer μC.

The shutter block (SB) operates the lens autofocusing operations and controls shutter exposure according to signals from the micro-computer μC.

Motor driver MDR1 is a driver to operate the zoom motor M1. It drives the motor forward or backward, or executes braking or stopping operations, in accordance with the output status (combination of "high" and "low") of MC1 and MC2 of the micro-computer μC.

Motor driver MDR2 is a driver for the film advancing/ rewinding motor M2 and has the same controlling capacity as the motor driver MDR1, according to the output status of MC3 and MC4 of the micro-computer μC.

Motor driver MDR3 is a driver to operate the vertical rotation driving motor M3, with the same controlling capacity as the motor driver MDR1, according to the output status of MC5 and MC6 of the micro-computer μC.

Motor driver MDR4 is a driver to operate the horizontal rotation driving motor M4, with the same controlling capacity as the motor driver MDR1, according to the output status of MC7 and MC8 of the micro-computer LED 1 is the LED indicator 12 in FIG. 1, and is lit or extinguished by the terminal LD1 of the micro-computer μC.

When the position sensor device PSD receives remote control signals, the detection circuit DCT calculates the relative angle between the optical axis of lens 7 and the remote controller 13 at that time, and transmits data regarding the angle to the micro-computer μC.

LED 2 is an infrared LED to send remote control signals by infrared beam to the camera, and is shown as 15 in FIG. 2. When the remote control switch SREM is turned ON via the remote control button 14 (FIG. 2), LED 2 becomes illuminated and sends signals to the camera body CA.

Figure 13A:
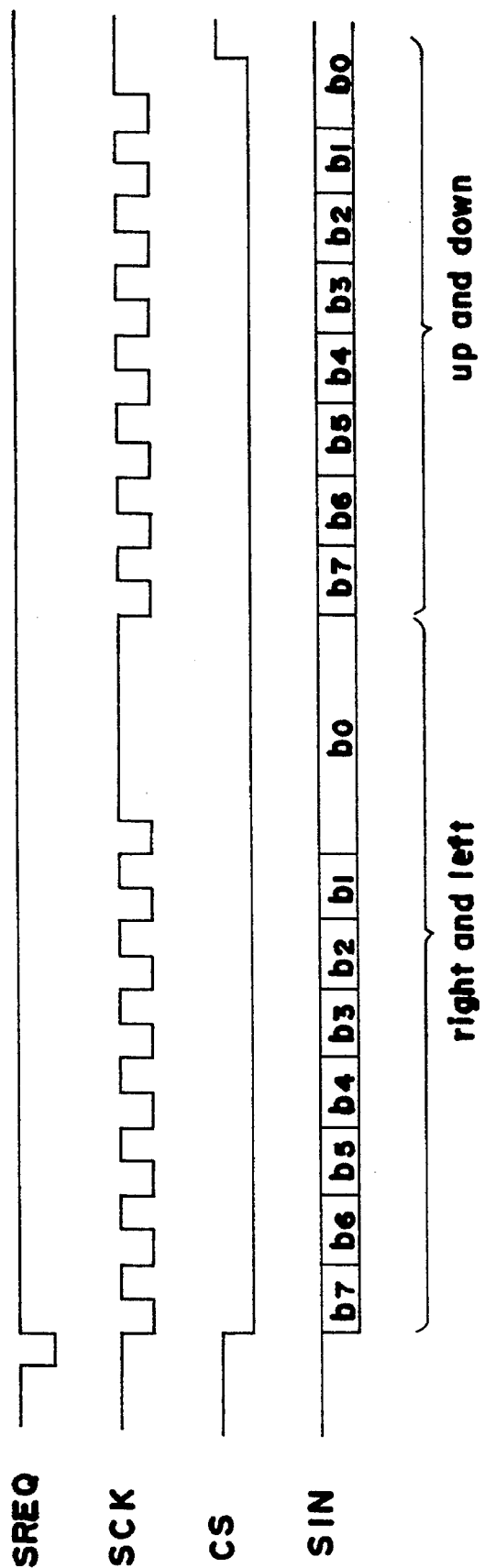

The communication between the detection circuit DCT and the micro-computer μC is explained in FIG. 13 (a). The detection circuit DCT and the micro-computer μC are connected by four lines, SREQ, SCK, CS and SIN. When the detection circuit DCT receives signals from the position sensor device PSD activated by remote control signals, it changes the signal level of the line SREQ to "low", and requests communication from the micro-computer μC. The micro-computer μC, detecting the low level of the line SREQ, changes the level of the line CS to "low". When it is confirmed that the level of the line SREQ thereby changed to "high", an 8-bit clock is transmitted for serial communication. In a synchronized fashion, the detection circuit DCT sends data on the camera angle (right/left) to the micro-computer μC. Following this process, the micro-computer μC transmits the 8-bit clock again. In response to this transmission, the detection circuit DCT sends the data on the up/down angle to the micro-computer μC. Then the micro-computer μC returns the level of CS to "high". Through the above sequence, data on angles are communicated.

Next, the above-mentioned 8-bit data is explained with FIGS. 13 (b) and (c). In case of data on the right/left angle (FIG. 13 (b)), the 6 bits from b0 to b5 contain the information on the angle between the optical axis of the lens and the remote controller. The minimum unit is 1 degree. b6 is not used, and b7 provides information on whether the remote controller 13 is located to the right or the left in relation to the optical axis. For example, when the remote controller 13 is located at a 45-degree angle to the right facing the camera, the data on the right/left angle will read 0*101101 (*="Disregard"). The same principle holds true regarding data on the up/down angle (FIG. 13 (c)).

Next, the operation of this embodiment is explained below in the flow chats contained in FIGS. 14 to 19.

Figure 14:
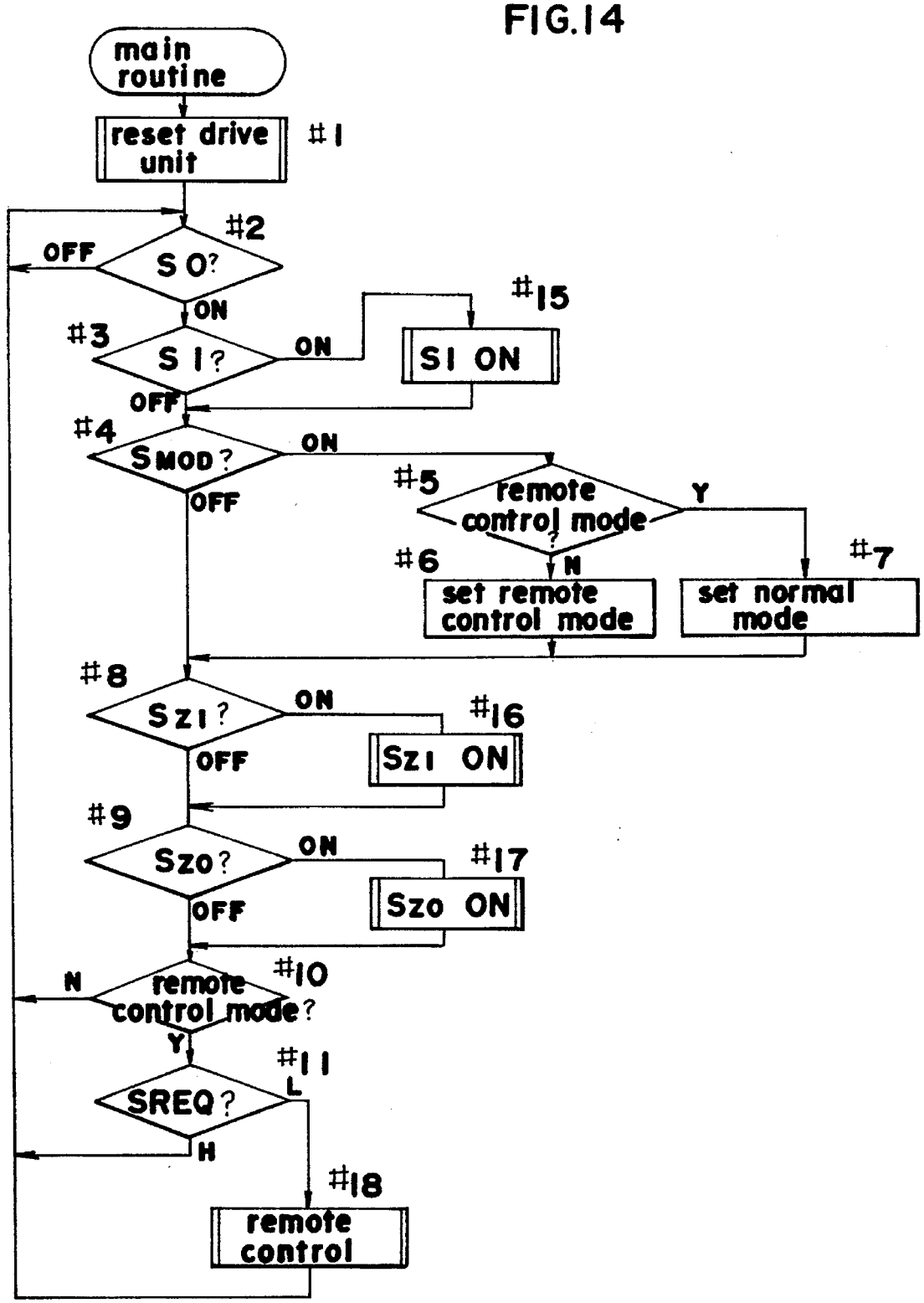
FIG. 14 is a flowchart showing main routine.

FIG. 14 is a flow chart of the main routine. When a battery is placed in the camera body CA, reset of the drive unit is performed in Step #1. Reset of the drive unit means to return the vertical rotation drive unit 10 and the horizontal rotation drive unit 11 to the initial position. In other words, this is an operation to return the camera body CA to the position where there is no discrepancy between the camera body CA and the horizontal stand unit 11A (hereinafter referred as "center position") as well as between the camera body CA and the vertical stand unit 10A (hereinafter referred to as "horizontal position").

Then the process advances to Step #2, where it is determined whether the main switch SO is ON. If it is ON, the process advances to Step #3. If it is OFF, the operation in Step #2 is repeated until switch SO is turned ON.

In Step #3, whether the light/distance-measuring switch S1 is ON or OFF is determined. If it is ON, the process advances to the S1-ON routine in Step #15. This routine is explained later. If the switch S1 is OFF, the process advances to Step #4, and it is determined whether the mode switch SMOD is ON or OFF. If it is OFF, the process advances to Step #8. If it is ON, the process advances to Step #5 and it is determined whether the camera is in remote control mode or normal mode.

If it is in normal mode, the process advances to Step #6 and the camera is set in remote control mode. If it is in remote control mode, the process advances to Step #7 and the camera is set in normal mode, and then the process advances to Step #8. Namely, each time the mode switch SMOD is turned ON, the mode setting alternately changes from normal to remote control, and vice versa.

In Step #8, it is determined whether the zoom-in switch SZI is ON or OFF. If it is ON, the process advances to the SZI-ON routine of Step #16. If it is OFF, the process advances to Step #9.

In Step #9, it is determined whether the zoom-out switch SZO is ON or OFF. If it is ON, the process advances to the SZO-ON routine of Step #17. If it is OFF, the process advances to Step #10 and it is determined whether or not the camera is in remote control mode.

If it is not in remote control mode, i.e., if it is in normal mode, the process returns to Step #2 and the above operation is repeated. If it is in remote control mode, the status of line SREQ is transmitted, and if it is "high", the process goes back to Step #2. If the status of line SREQ is "low", namely, if the position sensor device PSD has received the remote control signals, the process advances to the remote control routine of Step #18.

Figure 15:
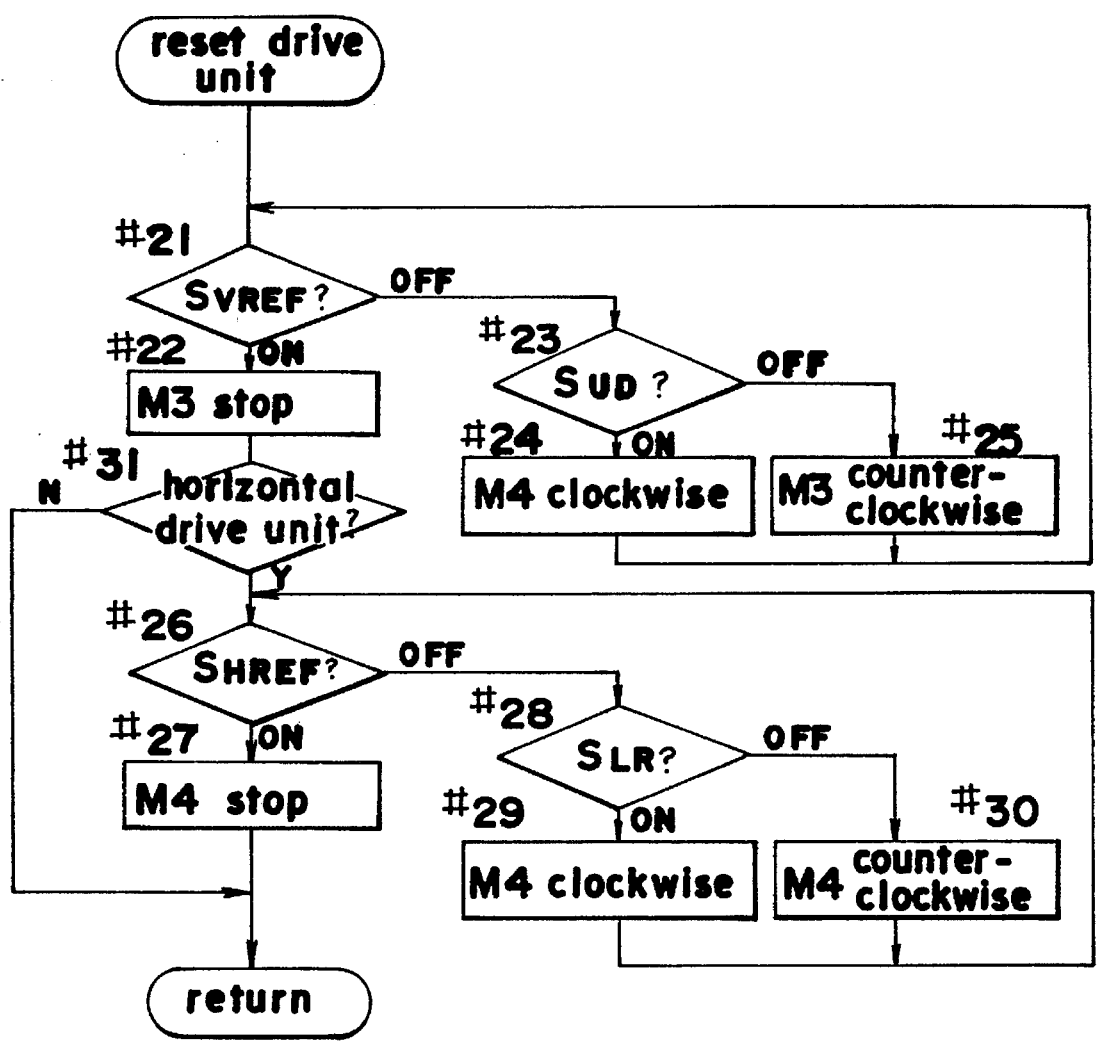
FIG. 15 is a flowchart showing sub-routine for resetting the drive unit.

Next, FIG. 15 is a flow chart of steps to return the drive unit to the initial position (a sub-routine of Step #1 in FIG. 14). First, in Step #21, in accordance with the ON/OFF status of the vertical reference switch SVREF, it is determined whether the camera body CA is in the horizontal position. If it is not, the process advances to Step #23. There, in accordance with the ON/OFF status of the up/down detection switch SUD, it is determined whether the camera is facing upward or downward. The direction of rotation of the motor M3 is controlled by this determination, and the motor rotates forward or backward accordingly (Steps #24, #25). Then Step #21 and the subsequent steps described above are repeated. After that, when the camera body CA is in horizontal position and the vertical reference switch SVREF is ON, the process advances from Step #21 to Step #22, and stops the motor M3. In Step #31, if the horizontal rotation drive unit 11 is not mounted, the process goes back to the main routine. If it is mounted, the process advances to Step #26 and resets the horizontal rotation drive unit 11 to the initial position. This operation is performed in the same manner as in the case of the above-mentioned vertical rotation drive unit 10. Namely, in Step #26, depending on the ON/OFF status of the horizontal reference switch SHREF, it is determined whether or not the camera body CA is in the center position. If it is not in the center position, the process goes on to Step #28, and it is determined in accordance with the ON/OFF status of the right/left detection switch SLR whether the camera body CA is facing right or left. The direction of rotation of the motor M4 is thus determined and the motor rotates forward or backward accordingly (Step #29 or #30). Then, the process returns to Step #26 and the operation is repeated. After that, when the camera body CA returns to the center position and the horizontal reference switch SHREF is ON, the process advances from Step #26 to Step #27, stops the motor M4 and returns to the main routine.

Figure 16:
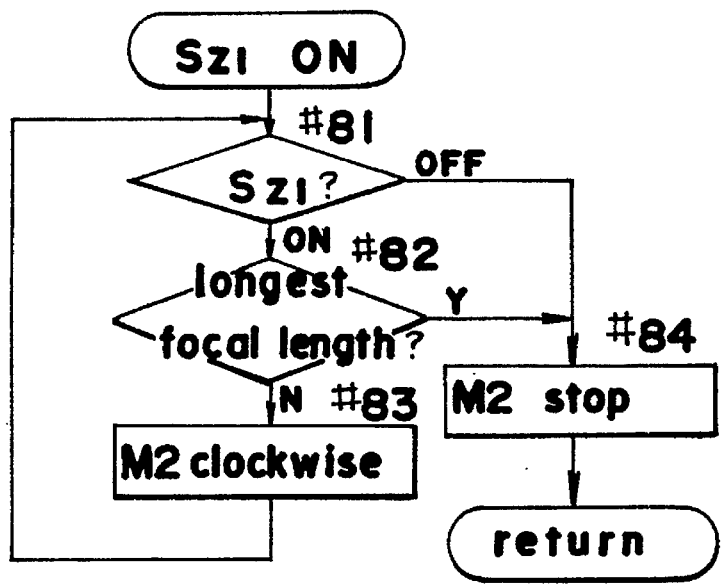
FIGS. 16A and 16B is a flowchart showing sub-routine for zooming operation.
Figure 16:
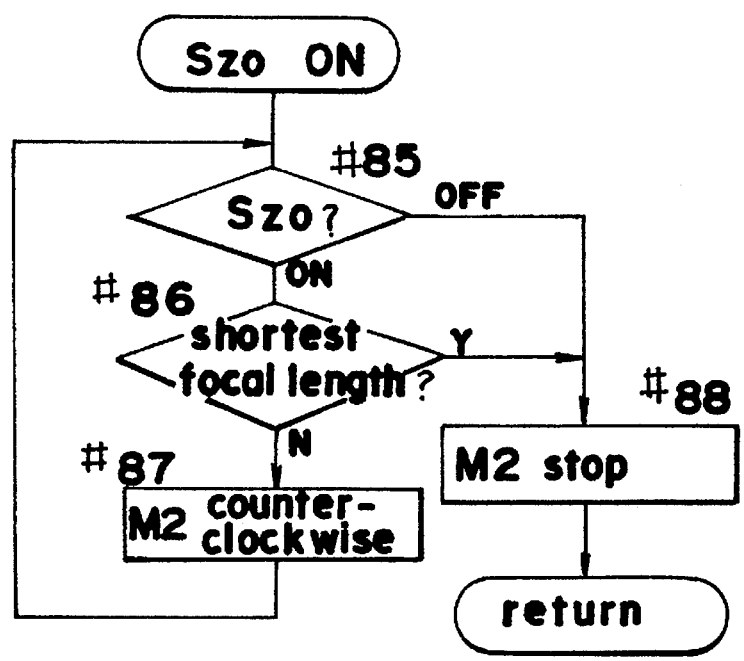

FIGS. 16 (a) and (b) are flow charts of the SZI-ON routine and SZO-ON routine which drive the zoom lens. These processes are begun by manipulating the zoom lever 8, which turns on the zoom-in switch SZI or the zoom-out switch SZO. FIG. 16 (a) is a flow chart for when the zoom-in switch SZI is ON. First, in Step #81, it is determined whether or not the zoom-in switch SZI is still ON. If it is ON, it is determined in Step #82 whether or not the zoom lens is at the longest focal length. If it is not, the process advances to Step #83 and the zoom motor M2 is rotated forward to move the lens towards the longest focal length. Then the process returns to Step #81 and the above operation is repeated.

When the zoom-in switch SZI becomes set to OFF in Step #81, or when it is determined that the lens is at the longest focal length in Step #82, the process advances to Step #84, stops the zoom motor M2, and returns to the main routine in FIG. 14.

FIG. 16 (b) is a flow chart for when the zoom-out switch SZIO is ON. The operation is the same as in the case of a zoom-in.

Figure 17A:
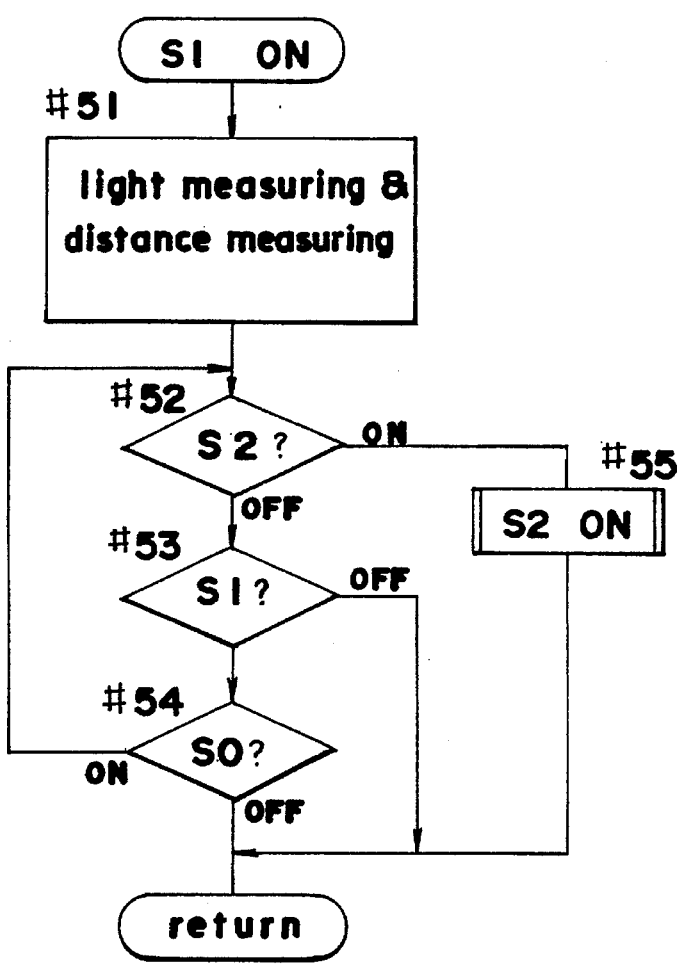
FIGS. 17A and 17B is a flowchart showing sub-routine for measuring light/distance and for exposing.

FIG. 17 is a flow chart for light and distance measurement and shutter release. When it is determined that the switch S1 is ON in the main routine, measurement of light and distance is executed in Step #51 by the aforementioned AF/AE block. Then in Step #52, it is determined whether or not the release switch S2 is ON. If it is OFF, the process advances to Step #53 and it is determined whether or not the light/distance measuring switch S1 is ON. If it is ON, the process advances to Step #54. If it is OFF, it returns to the main routine.

In Step #54, it is determined whether or not the main switch SO is ON. If it is ON, the process returns to Step #52 and the above process is repeated. If it is OFF, the process returns to the main routine.

When the release switch S2 is determined to be ON in Step #52, the process goes on to Step #55. The S2-ON sub-routine is called. In the S2-ON sub-routine described in FIG. 17(B), the following procedures are executed: lens operation for autofocusing (#56), exposure release sequence (#57), lens reset (#58) and film advancing (#59). And the process goes back to Step #1 of the main routine.

In the above-described light and distance measurement, the data on distance is expressed in a prescribed zone number. The relationship between the distance to the subject and focus position is shown in FIG. 18. In this embodiment, an appropriate focus position corresponding to the distance measurement carried out by the AF/AE block is determined, and the lens is moved in accordance with this focus position determination.

Figure 19:
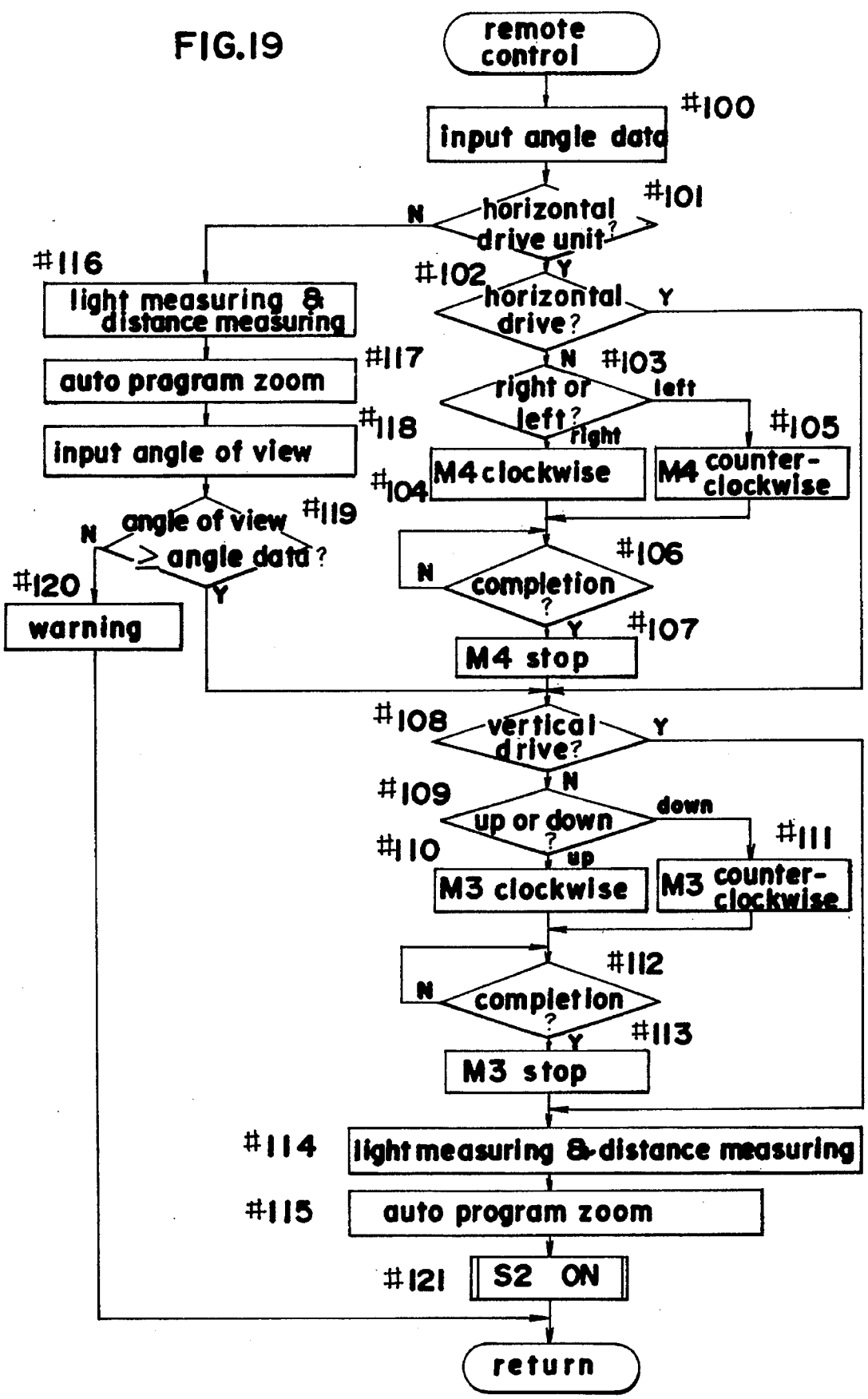
FIG. 19 is a flowchart showing sub-routine for remote control mode.

FIG. 19 is a flow chart for operation in remote control mode. In remote control mode, when the detection circuit DCT receives infrared signals from the remote controller 13, the signal level of the line SREQ becomes "low". Through this drop in level, the remote control sub-routine in FIG. 19 is called in Step #18 of the main routine in FIG. 14.

First, in Step #100, the data on the optical axis of the lens and the angle in relation to the remote controller 13 are transmitted from the detection circuit DCT using the method shown in FIG. 13. Then, in Step #101, it is determined whether or not the horizontal rotation drive unit 11 is mounted on the camera body CA. If it is so mounted, the process advances to Step #102 and it is determined whether horizontal rotation of the camera body CA is necessary. If it is determined not necessary, the process goes on to Step #108. If it is determined necessary, the process advances to Step #103 and the direction of rotation (right or left) is determined. In accordance with such determination, the horizontal motor M4 operates forward or backward.

Then the process advances to Step #106. Here the number of pulse waves shown in FIG. 12 is measured by the switch SHPUL and it is determined whether rotation to the desired angle is complete. If it is not complete, the measurement operation is repeated until the rotation is complete.

When the rotation is complete, the process goes on to Step #107 and the motor M4 is stopped. Then the process advances to Step #108.

If it is determined in Step #101 that the horizontal rotation drive unit 11 is not mounted to the camera body CA, the process advances to light/distance measuring (Step #116) and auto-program zooming (Step #117, explained below). After that, information on the input angle of view is obtained from the focal length (#118). This information is then compared with the angle data obtained in Step #100 and it is determined whether the subject, who operates the remote controller 13, is in the input angle of view. In other words, it is determined whether the input angle of view is larger than the angle between the optical axis and the remote controller (#119). If the subject is not within the range of the input angle of view, the process advances to Step #120 and a warning is executed by the illumination of LED 12 (LED 1 in FIG. 4).

Steps #108 to #113 are a process for vertical rotation of the camera body CA and are identical to the above-described operation of Steps #102 through #107.

Figure 17B:
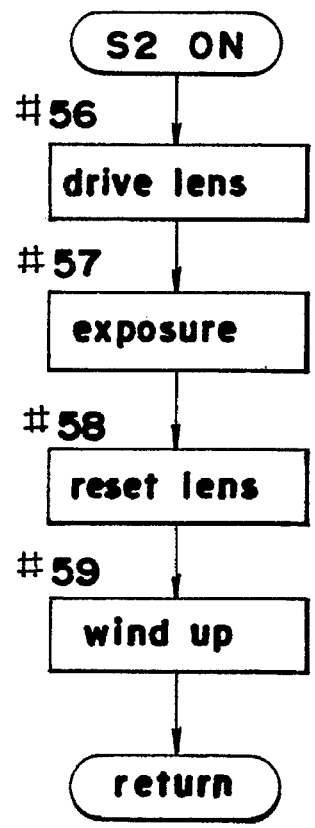

Through the above operation, the camera body CA comes to face the remote controller 13. Then the process goes on to Step #114 and the aforementioned light/distance measurement is executed. In Step #115, after auto-program zooming, the S2-ON sub-routine in FIG. 17(B) is called and the release sequence is performed (#121).

If it is determined in Step #101 that the horizontal rotation drive unit 11 is not mounted to the camera body CA, the process advances to Step #108 and the procedures contained in this step are executed.

In Step #115 in the above-described FIG. 19, auto-program zooming is performed. This operation is explained below.

FIG. 20 illustrates the relationship of the output of ZENC0 to ZENC4 of the zoom encoder and the typical lens focal length of lens 7. The zoom encoder is a gray-code type encoder and exhibits the pattern shown in the middle of FIG. 20. It has 21 zoom positions, expressed in numbers 1 through 21. A typical focal length is shown for each zoom position in the figure. For example, when the zoom position is 1, the typical focal length is 90 mm and the zoom lens is at the longest focal length. On the other hand, when the zoom position is 19, the representative focal length is 38 mm and the zoom lens is at the shortest focal length. When the lens 7 is retracting or retracted, the zoom position is 20 or 21, respectively.

The encoder output signals of "high" and "low", showing the ON/OFF status of the encoder pattern, are shown under the heading of "function". The hexadecimal code conveys information on the function through the use of hexadecimal numbers. Namely, when the zoom position is determined, the representative focal length is also determined accordingly. The output data then is transmitted in 5 bits as a hexadecimal code.

Auto program zooming is a function to automatically perform zooming to achieve f (focal length)=β(pre-set magnification rate)×D (distance to the subject) so that the preset magnification rate β can be obtained in relation to the subject.

In the auto-program zooming function, when for example a photo is taken with the camera resting horizontally, a magnification rate β=1/70 is selected if the whole-body photo mode is chosen, β=1/35 is selected if the upper-body mode photo mode is chosen, and β=1/15 is selected if the face-photo mode is chosen.

Next, how the focal length f is obtained in the auto-program zooming function is explained in FIG. 21. Table T1 refers to a prescribed parameter D from the focus position corresponding to the subject's distance, shown in FIG. 18. The parameter D expresses the subject's distance represented by focus position in millimeter units.

The focal distance f is obtained by calculating the product of the parameter D and the magnification rate β prescribed by the photo-taking mode. Table T2 shows the final location of the lens in the auto-program zooming function by zoom position based on the focal length f.

In the above process, the final position of the lens in auto-program zooming can be obtained from the data obtained by measurement of light and distance. Both tables T1 and T2 are contained on RAM chips in the CPU inside the micro-computer µC.

Figure 22:
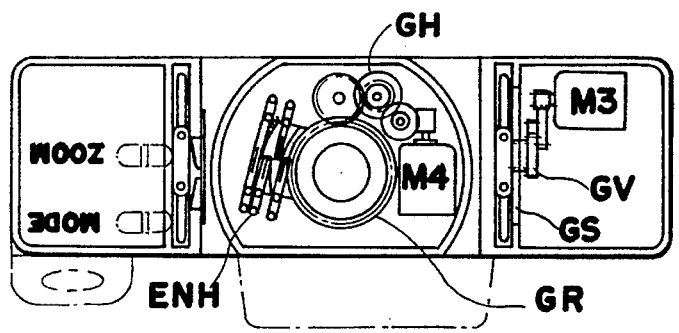
FIGS. 22A, 22B, and 22C illustrate the external structure of the camera body of the second embodiment of the present invention.
Figure 22:
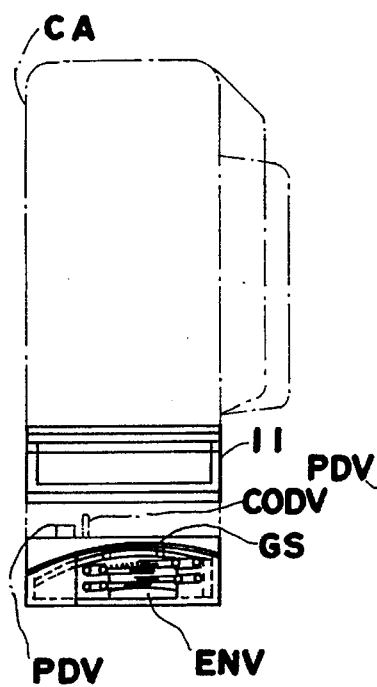
Figure 22:
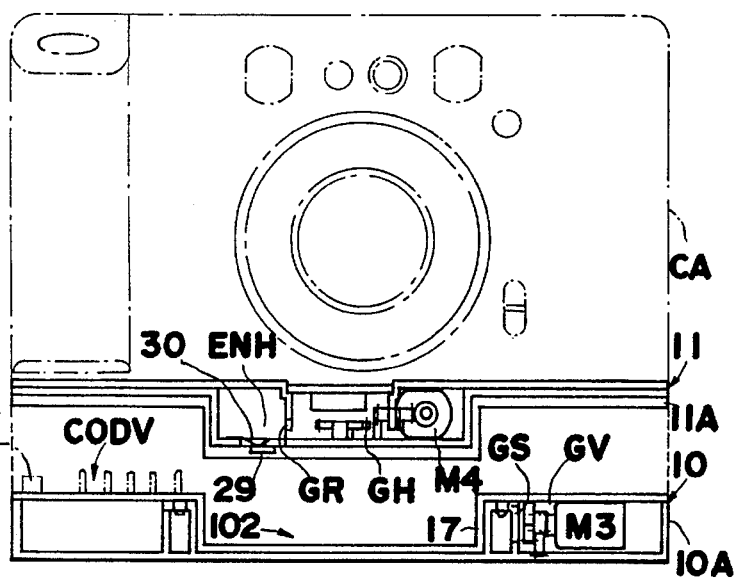
Figure 23:
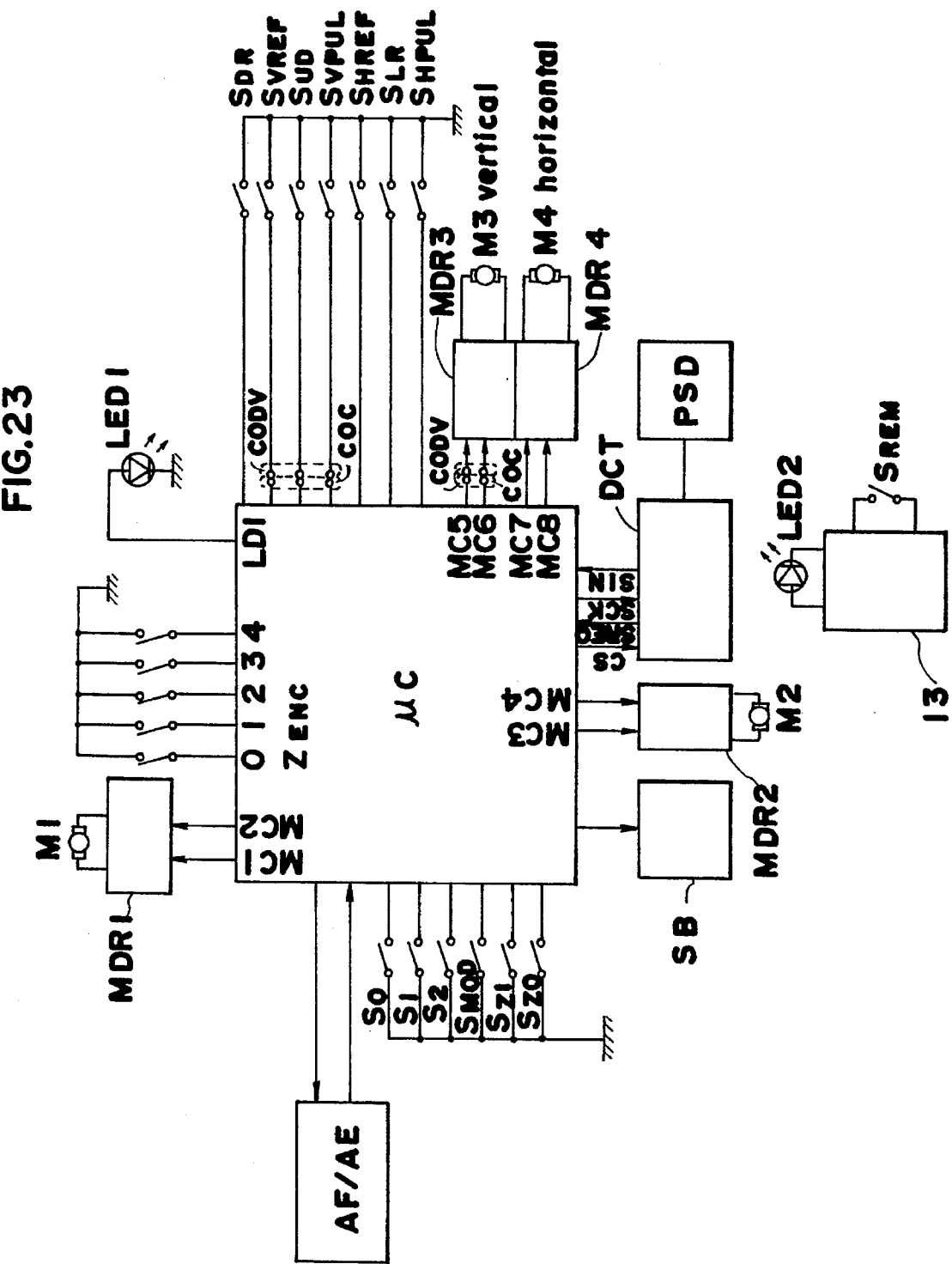
FIG. 23 is a block circuit diagram showing the camera system of the second embodiment.
Figure 24:
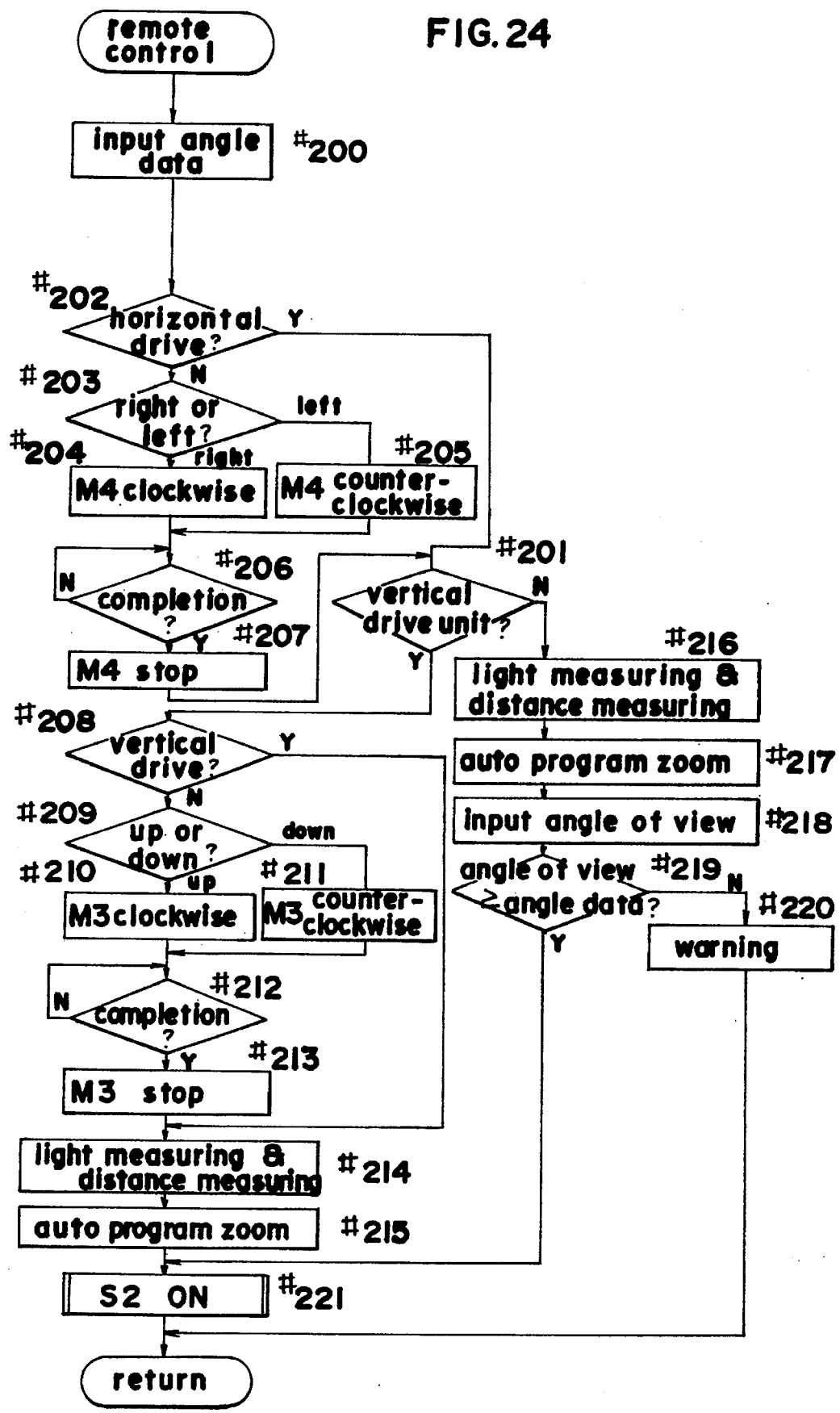
FIG. 24 is a flowchart showing sub-routine for remote control mode of the embodiment.

FIGS. 22 through 24 illustrate a second embodiment of this invention. This embodiment is different from the first embodiment shown in FIG. 3 in that the horizontal rotation drive unit 11 is pre-integrated to the camera body CA; however, all other features are the same. In particular the mechanisms of the vertical rotation drive unit 10 and the horizontal rotation drive unit 11 are essentially the same as the mechanisms shown in FIG. 3. Since their differences are minor enough for us to easily understand via FIGS. 3 through 9, explanation is omitted.

In FIG. 22, connecting pins CODV connect the horizontal rotation drive unit 11 to the camera body CA and PDV is a mount detection pin.

The operation of the second embodiment is the same as that of the first, except for the remote control sub-routine in FIG. 19. Therefore, explanation is given only regarding the remote control sub-routine, with reference to the flow chart in FIG. 24.

In the second embodiment, the vertical rotation drive unit 10, a component fixed to the camera body CA in the first embodiment, is detachable, and the horizontal rotation drive unit 11, a detachable component in the first embodiment, is fixed to the camera body CA. Therefore, when compared with the remote control sub-routine of the first embodiment shown in FIG. 19, the step wherein it is determined whether or not the horizontal rotation drive unit 11 is mounted before carrying out the steps for horizontal rotation movement (#202–#207) is omitted, while the step wherein it is determined whether or not the vertical rotation drive unit 10 is mounted (#201) is added before carrying out the steps for vertical rotation movement (#208–#213). All other operations are the same as that for the remote control sub-routine in FIG. 19.

Figure 26:
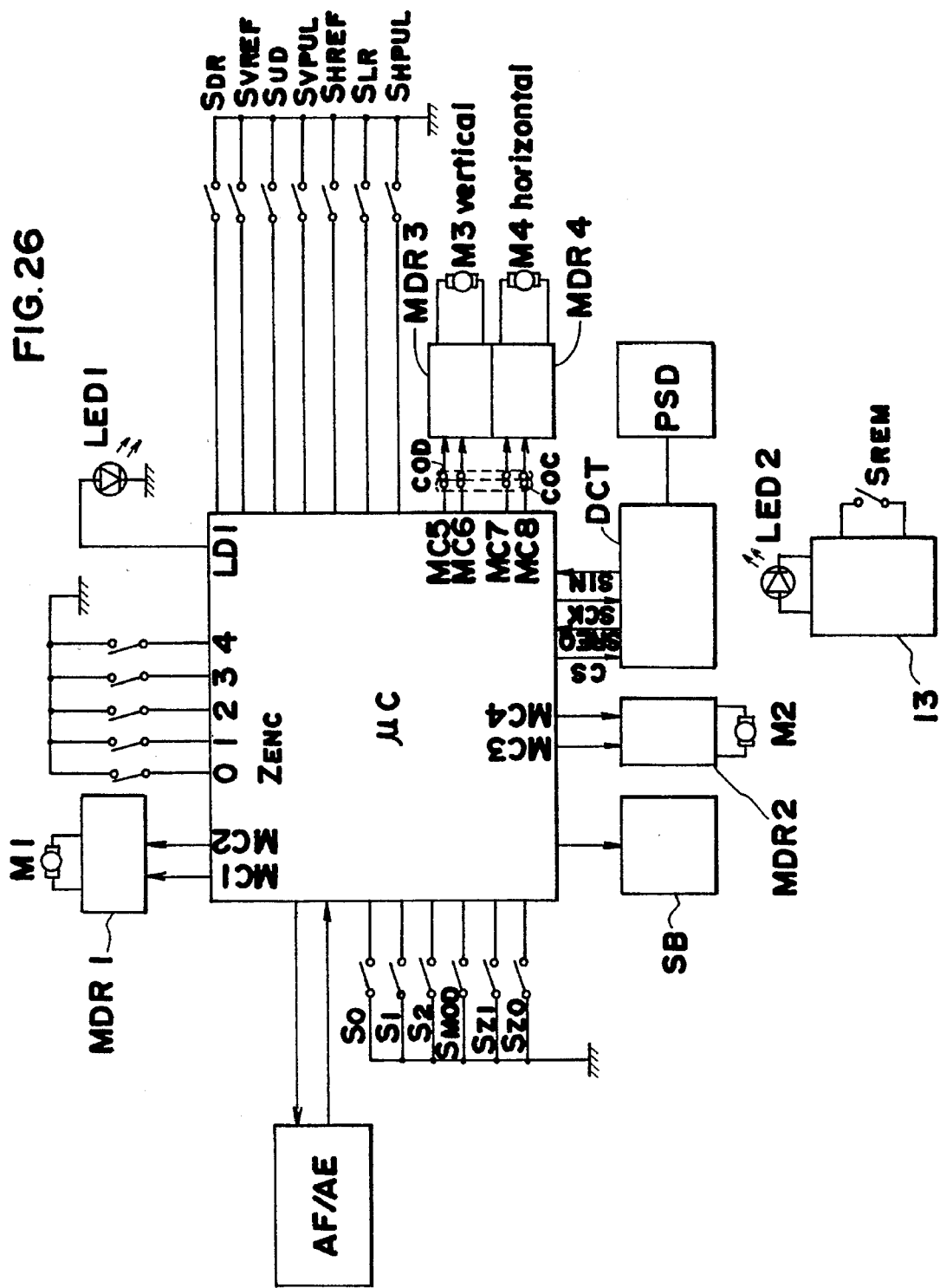
FIG. 26 is a block circuit diagram showing the camera system of the third embodiment.
Figure 27:
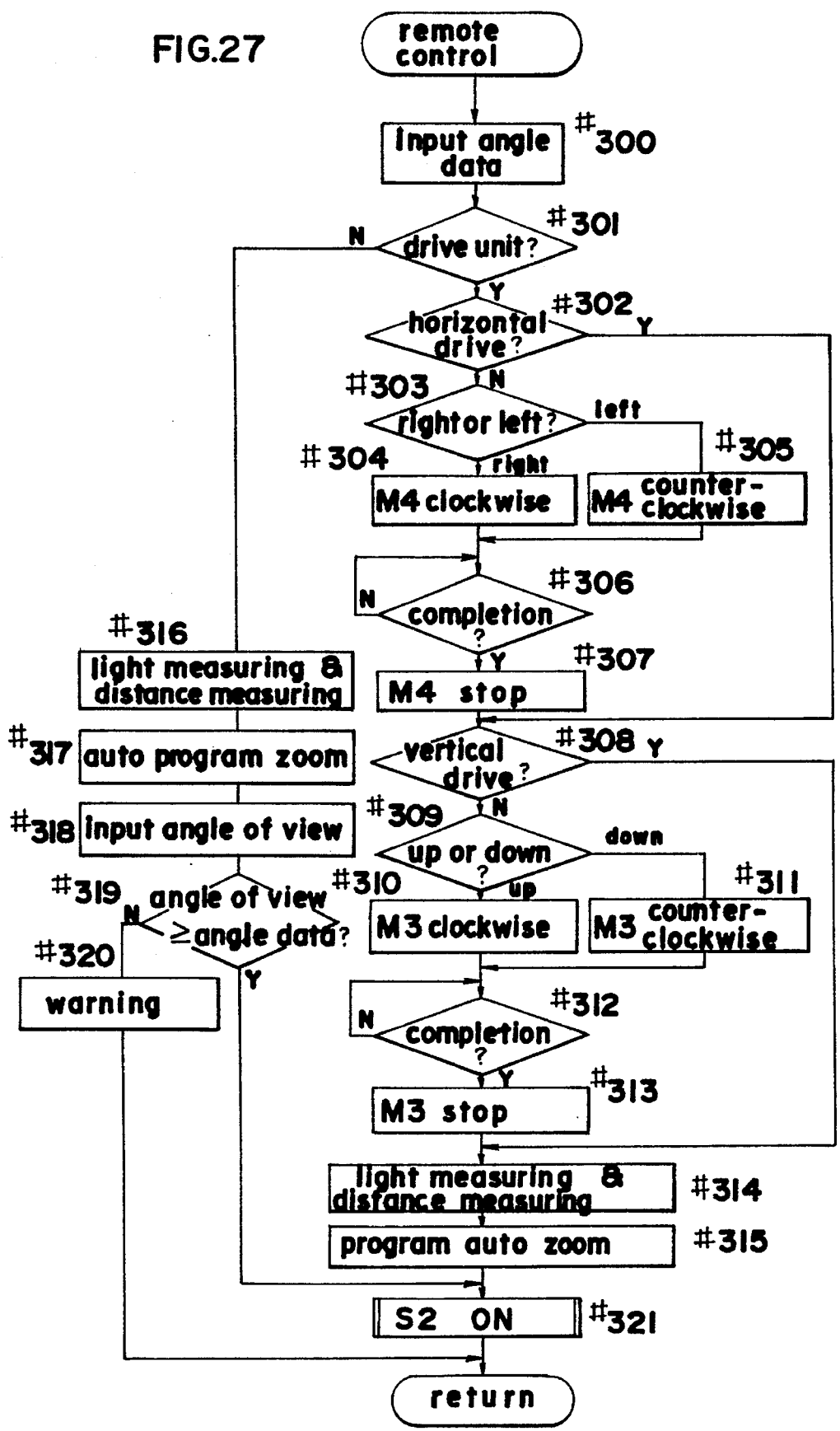
FIG. 27 is a flowchart showing sub-routine for remote control mode of the third embodiment.

FIGS. 25 through 27 show a third embodiment of this invention. In this embodiment, there is no rotation drive unit integrated to the camera body CA, and both horizontal and vertical rotation drive units 10 and 11 are detachable as one unit. Since everything else is the same as in the first embodiment, explanation is omitted. In FIG. 25, connecting pins COD connect the horizontal/vertical rotation drive unit 10/11 to the camera body CA, and PD is a mount detection pin.

As in the case of the second embodiment, the operation of the third embodiment is the same as that of the first embodiment except for the remote control sub-routine in FIG. 19. In the remote control sub-routine of the third embodiment shown in FIG. 27, there is a step wherein it is determined whether or not the horizontal/vertical rotation drive unit 10/11 is mounted (#301) before the steps for horizontal and vertical rotation movement (#302–#313) are carried out. Therefore, when the horizontal/vertical rotation drive unit is not mounted to the camera body CA, light/distance measuring and auto-program zooming are executed without any horizontal or vertical rotation movements. All other operations are the same as that for the remote control sub-routine of FIG. 19.

What is claimed is:

1. A remote controllable camera system, comprising:

a remote control device for sending a predetermined signal;

means, provided in a camera body, for receiving the predetermined signal sent from said remote control device;

means, provided in the camera body, for calculating an angle between said remote control device and an optical axis of a photo-taking lens mounted on the camera body on the basis of the receiving result of said receiving means; and means for moving the optical axis of the photo-taking lens to a point where the angle between said remote control device and the optical axis is a predetermined value on the basis of the calculation result of said calculating means, said moving means being detachable from the camera body.

2. A remote controllable camera system claimed in claim 1, further comprising means for exposing a film after said moving means moves the optical axis of the photo-taking lens in response to the predetermined signal sent from said remote control device.

3. A remote controllable camera system claimed in claim 2, further comprising means for detecting whether said moving means is attached to the camera body and wherein said exposing means exposes a film immediately in response to the predetermined signal when said detecting means detects said moving means is attached to the camera body.

4. A remote controllable camera system claimed in claim 1, further comprising:

means for inputting data on a field of view of the photo-taking lens;

means for judging whether or not said remote control device is in the field of view on the basis of the calculation result of said calculation means; and means for displaying the judging result of said judging means.

5. A remote controllable camera system claimed in claim 3, further comprising:

means for inputting data on a field of view of the photo-taking lens;

means for Judging whether or not said remote control device is in the field of view on the basis of the calculation result of said calculation means; and means for prohibiting an operation of said exposing means when said Judging means judges said remote control device is not in the field of view.

6. A remote controllable camera system claimed in claim 5, further comprising means for displaying the judging result of said judging means.

7. A remote controllable camera system, comprising:

a remote control device for sending a predetermined signal;

means for receiving the predetermined signal sent from said remote control device;

means for calculating an angle between said remote control device and an optical axis of a photo-taking lens mounted on a camera body on the basis of the receiving result of said receiving means;

means for inputting data on a field of view of the photo-taking lens;

means for judging whether or not said remote control device is in the field of view on the basis of the calculation result of said calculation means; and means for displaying the judging result of said judging means.

8. A remote controllable camera system, comprising:

a remote control device for sending a predetermined signal;

means for receiving the predetermined signal sent from said remote control device;

means for calculating an angle between said remote control device and an optical axis of a photo-taking lens mounted on a camera body on the basis of the receiving result of said receiving means;

means for inputting data on a field of view of the photo-taking lens;

means for judging whether or not said remote control device is in the field of view on the basis of the calculation result of said calculation means; and means for prohibiting an operation of said exposing means when said judging means judges said remote control device is not in the field of view.

9. A remote controllable camera system, comprising:

a remote control device for sending a predetermined signal;

a receiver which receives the predetermined signal sent from said remote control device;

a first driving device which moves an optical axis of a photo-taking lens right and left according to the received signal, said first driving device being provided in a camera body in a built-in manner; and a second driving device which moves the optical axis of the photo-taking lens up and down according to the received signal, said second driving device being separable from said first driving device and said second driving device being separate and detachable from the camera body and being separated from the first driving device when detached from the camera body.

10. A remote controllable camera system claimed in claim 9, further comprising a calculator which calculates an angle between said remote control device and the optical axis of the photo-taking lens mounted on the camera body on the basis of the receiving result of said receiver.

11. A remote controllable camera system claimed in claim 10, further comprising an exposing device which exposes a film after said first or second driving device moves the optical axis of the photo-taking lens according to the received signal.

12. A remote controllable camera system claimed in claim 10, further comprising:

an input device which inputs data on a field of view of the photo-taking lens;

a judging device which judges whether or not said remote control device is in the field of view on the basis of the calculation result of said calculator; and a display device which displays the judging result of said judging device.

13. A remote controllable camera system claimed in claim 11, further comprising:

an input device which inputs data on a field of view of the photo-taking lens;

a judging device which judges whether or not said remote control device is in the field of view on the basis of the calculation result of said calculator; and a prohibition device which prohibits an operation of said exposing device when said judging device judges said remote control device is not in the field of view.

14. A remote controllable camera system, comprising:

a remote control device for sending a predetermined signal;

a receiver which receives the predetermined signal sent from said remote control device;

a first driving device which moves an optical axis of a photo-taking lens up and down according to the received signal, said first driving device being provided in a camera body in a built-in manner; and a second driving device which moves the optical axis of the photo-taking lens right and left according to the received signal, said second driving device being separable from said first driving device and said second driving device being separate and detachable from the camera body and being separated from the first driving device when detached from the camera body.

15. A remote controllable camera system claimed in claim 14, further comprising a calculator which calculates an angle between said remote control device and the optical axis of the photo-taking lens mounted on the camera body on the basis of the receiving result of said receiver.

16. A remote controllable camera system claimed in claim 15, further comprising an exposing device which exposes a film after said first or second driving device moves the optical axis of the photo-taking lens according to the received signal.

17. A remote controllable camera system claimed in claim 15, further comprising;

an input device which inputs data on a field of view of the photo-taking lens;

a judging device which judges whether or not said remote control device is in the field of view on the basis of the calculation result of said calculator; and a display device which displays the judging result of said judging device.

18. A remote controllable camera system claimed in claim 16, further comprising:

an input device which inputs data on a field of view of the photo-taking lens;

a judging device which judges whether or not said remote control device is in the field of view on the basis of the calculation result of said calculator; and a prohibition device which prohibits an operation of said exposing device when said judging device judges said remote control device is not in the field of view.

19. A remote controllable camera system, comprising:

a remote control device for sending a predetermined signal;

means for receiving the predetermined signal sent from said remote control device;

means for calculating an angle between said remote control device and an optical axis of a photo-taking lens mounted on a camera body on the basis of the receiving result of said receiving means;

means for moving the optical axis of the photo-taking lens to a point where the angle between said remote control device and the optical axis is a predetermined value on the basis of the calculation result of said calculating means; and means for resetting said moving means in order to turn back the optical axis of the photo-taking lens to a previous direction, to which the optical axis had faced when the receiving means received the signal, after every exposing operation for one frame is completed.

20. A remote controllable camera system, comprising:

a remote control device for sending a predetermined signal;

means for receiving the predetermined signal sent from said remote control device;

means for moving an optical axis of the photo-taking lens in response to the receiving signal; and means for measuring an object distance for a focusing operation only subsequent to an event that the moving operation of the optical axis by the moving means is stopped if the optical axis is moved.

21. A remote controllable camera system claimed in claim 20, further comprising:

means for carrying out a zooming operation on the basis of the object distance measured by the measuring means.

* * * * *